(12) United States Patent
Liu et al.

(10) Patent No.: US 10,511,550 B2
(45) Date of Patent: Dec. 17, 2019

(54) SYSTEMS AND METHODS FOR INSTANT MESSAGING

(71) Applicant: Tencent Technology (Shenzhen) Company Limited, Shenzhen (CN)

(72) Inventors: Kai Liu, Shenzhen (CN); Liangliang Fan, Shenzhen (CN); Chenglin Liu, Shenzhen (CN); Anqi Ren, Shenzhen (CN); Lejun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 777 days.

(21) Appl. No.: 14/620,693

(22) Filed: Feb. 12, 2015

(65) Prior Publication Data

US 2015/0188855 A1    Jul. 2, 2015

Related U.S. Application Data

(63) Continuation of application No. PCT/CN2014/076331, filed on Apr. 28, 2014.

(30) Foreign Application Priority Data

Sep. 11, 2013 (CN) .......................... 2013 1 0412576

(51) Int. Cl.
*H04L 12/28* (2006.01)
*H04L 12/58* (2006.01)
(Continued)

(52) U.S. Cl.
CPC .......... *H04L 51/04* (2013.01); *H04B 5/0031* (2013.01); *H04L 12/2823* (2013.01);
(Continued)

(58) Field of Classification Search
CPC ............ H04L 12/2809; H04L 12/2816; H04L 12/2823; H04L 43/065
See application file for complete search history.

(56) References Cited

U.S. PATENT DOCUMENTS 9,479,491 B1 * 10/2016 Farnsworth ............. H04L 63/08
2003/0078979 A1 * 4/2003 Sagi ...................... H04L 12/581
709/206
(Continued)

FOREIGN PATENT DOCUMENTS

CN        1599903 A    3/2005
CN      101242376 A    8/2008
(Continued)

OTHER PUBLICATIONS

China Patent Office, Office Action dated Nov. 4, 2015, in Application No. 201310412576.4.
(Continued)

*Primary Examiner* — Jerry B Dennison
(74) *Attorney, Agent, or Firm* — Anova Law Group, PLLC

(57) ABSTRACT

Systems and methods are provided for instant messaging. For example, a first association relationship with at least one first apparatus client for instant messaging is established; and a first control instruction is transmitted to the at least one first apparatus client to trigger the at least one first apparatus client to control, according to the first control instruction, an intelligent apparatus connected to the at least one first apparatus client to execute one or more predetermined operations.

14 Claims, 16 Drawing Sheets

(51) Int. Cl.
    *H04L 29/08*     (2006.01)
    *H04B 5/00*      (2006.01)
    *H04M 3/533*     (2006.01)

(52) U.S. Cl.
    CPC .......... *H04L 51/046* (2013.01); *H04L 51/18* (2013.01); *H04L 67/125* (2013.01); *H04L 67/146* (2013.01); *H04M 3/533* (2013.01)

(56) References Cited

U.S. PATENT DOCUMENTS

| | | | | |
|---|---|---|---|---|
| 2006/0023922 A1* | 2/2006 | Black | ............... | G06K 9/00154 382/115 |
| 2006/0036703 A1* | 2/2006 | Fulmer | ............... | G06Q 10/107 709/207 |
| 2007/0286181 A1* | 12/2007 | Bushmitch | ......... | H04L 12/2803 370/356 |
| 2008/0061957 A1* | 3/2008 | Nguyen | ............. | G07C 9/00166 340/501 |
| 2008/0133812 A1* | 6/2008 | Kaiser | .................... | G06F 9/542 710/263 |
| 2008/0242222 A1* | 10/2008 | Bryce | ................. | H04L 12/2809 455/3.06 |
| 2009/0052442 A1* | 2/2009 | Chen | ................... | H04L 65/1069 370/389 |
| 2009/0306793 A1* | 12/2009 | Takebayashi | ....... | H04L 12/2809 700/8 |
| 2011/0046792 A1* | 2/2011 | Imes | ....................... | H04L 67/42 700/278 |
| 2011/0173257 A1* | 7/2011 | Tu | .......................... | H04L 12/581 709/203 |
| 2013/0179521 A1* | 7/2013 | Hu | .......................... | H04L 51/04 709/206 |
| 2014/0201212 A1* | 7/2014 | Qi | ......................... | H04L 67/303 707/741 |
| 2014/0250183 A1* | 9/2014 | Unagami | ............ | H04M 3/5166 709/204 |
| 2015/0295763 A1* | 10/2015 | Yu | .......................... | H04L 41/08 726/4 |

FOREIGN PATENT DOCUMENTS

| | | |
|---|---|---|
| CN | 101702690 A | 5/2010 |
| CN | 102413068 A | 4/2012 |
| CN | 102495618 A | 6/2012 |

OTHER PUBLICATIONS

Patent Cooperation Treaty, International Search Report, PCT/CN2014/076331, dated Jul. 18, 2014.
China Patent Office, Office Action Issued Feb. 15, 2016, in Application No. 201310412576.4.
Patent Cooperation Treaty, Written Opinion of the International Searching Authority, dated Jul. 18, 2014, in PCT/CN2014/076331.
Patent Cooperation Treaty, International Preliminary Report on Patentability, dated Mar. 15, 2016, in PCT/CN2014/076331.

* cited by examiner

SYSTEMS AND METHODS FOR INSTANT MESSAGING

CROSS-REFERENCES TO RELATED APPLICATIONS

This application is a continuation of International Application No. PCT/CN2014/076331, with an international filing date of Apr. 28, 2014, now pending, which claims priority to Chinese Patent Application No. 201310412576.4, filed Sep. 11, 2013, both applications being incorporated by reference herein for all purposes.

BACKGROUND OF THE INVENTION

Certain embodiments of the present invention are directed to computer technology. More particularly, some embodiments of the invention provide systems and methods for network communication. Merely by way of example, some embodiments of the invention have been applied to instant messaging. But it would be recognized that the invention has a much broader range of applicability.

The Internet of Things has been applied in certain fields, such as house automation, industrial control, and medical monitoring, which results in more convenience in people's daily work and life. For example, intelligent home systems are often established on the basis of the Internet of Things including a ZigBee module. ZigBee technology is a short-distance wireless communication technology with low power consumption. A ZigBee module often needs a gateway with ZigBee control functions and router functions, where the ZigBee module may establish a ZigBee network in the form of an ad hoc network through the gateway which is used for connecting an intelligent apparatus to the Internet. Within a particular network, if multiple ZigBee modules that are made by a same manufacturer share a same data format and a same standard, one of the ZigBee modules may connect with a plurality of other ZigBee to achieve unified management of multiple intelligent apparatuses simultaneously.

The conventional technology described above has some disadvantages. For example, a special gateway may be required for each ZigBee module for network connection, and it is usually very complicated to set up a ZigBee network. Secondly, the transmission rate of the Internet of Things based on ZigBee modules is often low and may be only applicable for controlling simple intelligent apparatuses with low speed requirements. Thirdly, there is no universal standard for management platforms of the Internet of Things based on ZigBee modules. Usually, different ZigBee modules use different data formats and cannot be universally used, which causes difficulties for unified management of a plurality of intelligent apparatuses simultaneously.

Hence it is highly desirable to improve the techniques for instant messaging.

BRIEF SUMMARY

According to one embodiment, a method is provided for instant messaging. For example, a first association relationship with at least one first apparatus client for instant messaging is established; and a first control instruction is transmitted to the at least one first apparatus client to trigger the at least one first apparatus client to control, according to the first control instruction, an intelligent apparatus connected to the at least one first apparatus client to execute one or more predetermined operations.

According to another embodiment, a method is provided for instant messaging. For example, an association relationship with at least one user client for instant messaging is established; a control instruction transmitted by the at least one user client is received; and an intelligent apparatus connected with the at least one user client is controlled according to the control instruction to execute one or more predetermined operations.

According to yet another embodiment, a method is provided for instant messaging. For example, a first addition request for adding a first association relationship corresponding to at least one first apparatus client is received from a first user client; a first successful-addition response is transmitted to the first user client, the first successful-addition response being used to trigger the first user client to establish the first association relationship with the at least one first apparatus client; and an addition command for adding the first association relationship is transmitted to the at least one first apparatus client, the addition command for adding the first association relationship being used to trigger the at least one first apparatus client to establish the first association relationship with the first user client.

In one embodiment, a user client includes: a relationship-establishing module configured to establish a first association relationship with at least one first apparatus client for instant messaging; and an instruction-transmitting module configured to transmit a first control instruction to the at least one first apparatus client to trigger the apparatus client to control, according to the first control instruction, an intelligent apparatus connected to the apparatus client to execute one or more predetermined operations.

In another embodiment, an apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations.

In yet another embodiment, an apparatus for instant messaging includes: an association-adding module configured to receive a first addition request for adding a first association relationship corresponding to at least one first apparatus client from a first user client; a response-transmitting module configured to transmit a first successful-addition response to the first user client, the first successful-addition response being used to trigger the first user client to establish the first association relationship with the at least one first apparatus client; and a command-transmitting module configured to transmit an addition command for adding the first association relationship to the at least one first apparatus client, the addition command for adding the first association relationship being used to trigger the at least one first apparatus client to establish the first association relationship with the first user client.

According to one embodiment, a component for instant messaging includes: an apparatus client. The apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations.

According to another embodiment, an intelligent apparatus includes: a component for instant messaging including an apparatus client. The apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations.

According to yet another embodiment, a system for instant messaging includes: a terminal; a server; and a first intelligent apparatus. The terminal includes a user client. The user client includes: a relationship-establishing module configured to establish a first association relationship with at least one first apparatus client for instant messaging; and an instruction-transmitting module configured to transmit a first control instruction to the at least one first apparatus client to trigger the at least one first apparatus client to control, according to the first control instruction, a second intelligent apparatus connected to the at least one first apparatus client to execute one or more predetermined operations. The server includes an apparatus for instant messaging. The apparatus for instant messaging includes: an association-adding module configured to receive a first addition request for adding the first association relationship corresponding to the at least one first apparatus client from a first user client; a response-transmitting module configured to transmit a first successful-addition response to the first user client, the first successful-addition response being used to trigger the first user client to establish the first association relationship with the at least one first apparatus client; and a command-transmitting module configured to transmit an addition command for adding the first association relationship to the at least one first apparatus client, the addition command for adding the first association relationship being used to trigger the at least one first apparatus client to establish the first association relationship with the first user client. The first intelligent apparatus includes a component for instant messaging including a second apparatus client. The second apparatus client includes: an association-establishing module configured to establish a second association relationship with at least one second user client for instant messaging; an instruction-receiving module configured to receive a second control instruction transmitted by the at least one second user client; and an apparatus-control module configured to control a third intelligent apparatus connected with the at least one second user client according to the second control instruction to execute one or more predetermined operations.

In one embodiment, a non-transitory computer readable storage medium includes programming instructions for instant messaging. The programming instructions configured to cause one or more data processors to execute certain operations. For example, a first association relationship with at least one first apparatus client for instant messaging is established; and a first control instruction is transmitted to the at least one first apparatus client to trigger the at least one first apparatus client to control, according to the first control instruction, an intelligent apparatus connected to the at least one first apparatus client to execute one or more predetermined operations.

In another embodiment, a non-transitory computer readable storage medium includes programming instructions for instant messaging. The programming instructions configured to cause one or more data processors to execute certain operations. For example, an association relationship with at least one user client for instant messaging is established; a control instruction transmitted by the at least one user client is received; and an intelligent apparatus connected with the at least one user client is controlled according to the control instruction to execute one or more predetermined operations.

In yet another embodiment, a non-transitory computer readable storage medium includes programming instructions for instant messaging. The programming instructions configured to cause one or more data processors to execute certain operations. For example, a first addition request for adding a first association relationship corresponding to at least one first apparatus client is received from a first user client; a first successful-addition response is transmitted to the first user client, the first successful-addition response being used to trigger the first user client to establish the first association relationship with the at least one first apparatus client; and an addition command for adding the first association relationship is transmitted to the at least one first apparatus client, the addition command for adding the first association relationship being used to trigger the at least one first apparatus client to establish the first association relationship with the first user client.

For example, the systems and methods described herein are configured to reduce the limitations and the complexity associated with the Internet of Things based on ZigBee modules and increase data transmission rates of the Internet of Things so as to achieve unified management of multiple intelligent apparatuses simultaneously. As an example, the systems and methods described herein are configured to provide a privilege management mechanism to realize standard and secure management of apparatuses in an instant-messaging system.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
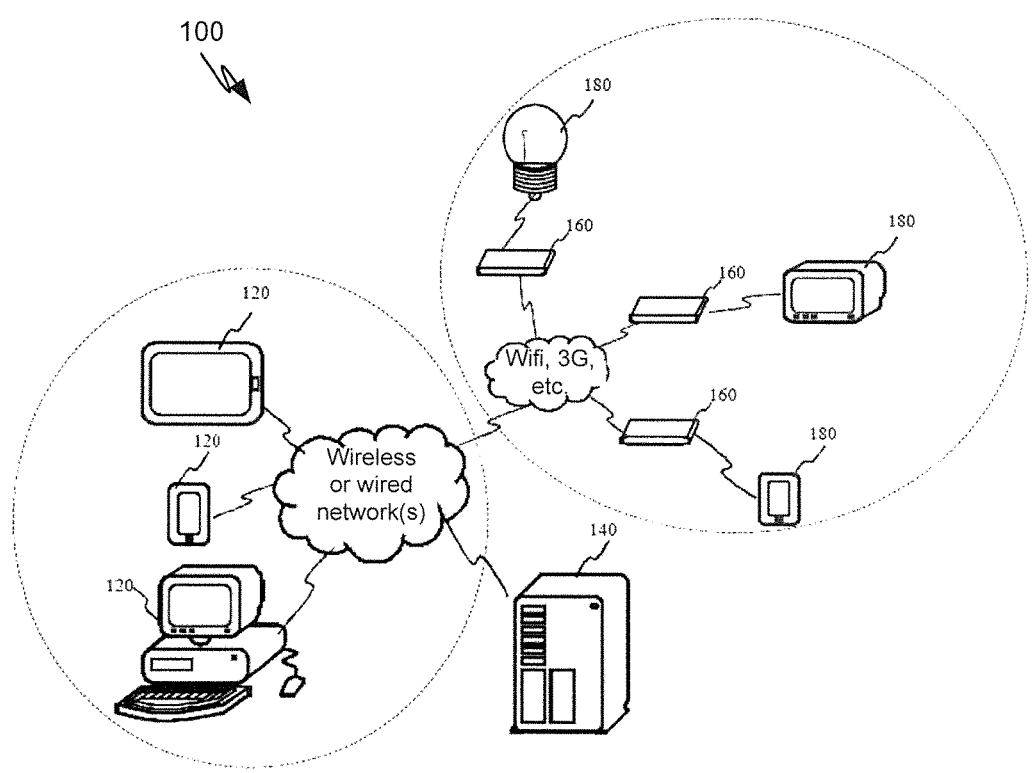
FIG. 1 is a simplified diagram showing an implementation environment for instant messaging according to one embodiment of the present invention.

FIG. 1 is a simplified diagram showing an implementation environment for instant messaging according to one embodiment of the present invention. The diagram is merely an example, which should not unduly limit the scope of the claims. One of ordinary skill in the art would recognize many variations, alternatives, and modifications. The implementation environment 100 includes at least one terminal 120, a server 140, at least one instant-messaging component 160 and at least one intelligent apparatus 180.

According to one embodiment, the terminal 120 includes an electronic device which runs a user client on the basis of an instant-messaging program. For example, the electronic device includes an intelligent mobile phone, a tablet computer, an e-book reader, a Moving-Picture-Experts-Group-Audio-Layer-III (MP3) player, a Moving-Picture-Experts-Group-Audio-Layer-IV (MP4) player, a laptop computer, a desktop computer, etc. In another example, the terminal 120 may be connected with the server 140 through a wireless network or a wired network. In yet another example, the server 140 may include a server, a server cluster including a plurality of servers, and/or a cloud computing service center. In yet another example, the server 140 is a backend server for the instant-messaging program.

According to another embodiment, the server 140 is connected with the instant-messaging component 160 through a predetermined network. For example, the predetermined network includes a Wireless-Fidelity (WIFI) network, a 3rd-Generation-Partnership-Project (3GPP) network, a 4G network, a Wireless LAN (WLAN) network, a wired network, and so on. As an example, the predetermined network includes a WIFI network or a mobile network with high transmission rates for convenience. In another example, the terminal 120 and the instant-messaging component 160 may also be connected through the predetermined network.

According to yet another embodiment, the instant-messaging component 160 includes an integrated circuit or a chip which runs an apparatus client on the basis of the instant-messaging program. For example, the instant-messaging component 160 and the intelligent apparatus 180 are connected through a predetermined interface. In another example, the instant-messaging component 160 may be integrated into the intelligent apparatus 180 (not shown in FIG. 1). In yet another example, a relevant program of the apparatus client may be recorded into a chip according to related transmission protocols, and then the chip may be processed to make the instant-messaging component 160. In yet another example, for a traditional apparatus, the instant-messaging component 160 may be processed into an integrated circuit or a chip, and then the integrated circuit or the chip may be mounted into a socket which has a relay and/or other components and be connected with the traditional apparatus through the predetermined interface. In yet another example, a table lamp with a socket including the instant-messaging component 160 may be remotely controlled through the terminal 120. In yet another example, for an intelligent apparatus, the instant-messaging component 160 may be processed into an integrated circuit or a chip, and then the integrated circuit or the chip may be directly integrated into the intelligent apparatus. In some embodiments, the intelligent apparatus 180 includes an intelligent electric light, an intelligent fan, an intelligent curtain, an intelligent camera, an intelligent pet feeder, an intelligent socket, an intelligent air-conditioner, an intelligent electric cooker, an intelligent refrigerator, an intelligent wristwatch, a pair of intelligent glasses, a pair of intelligent shoes, and so on.

Figure 2:
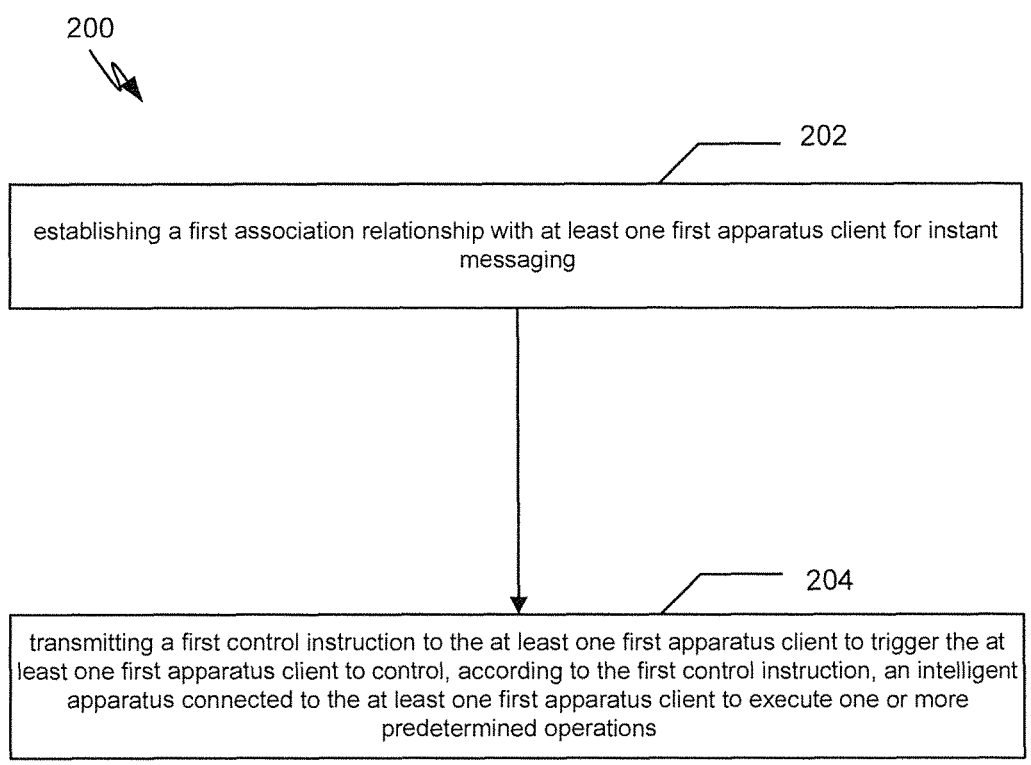
FIG. 2 is a simplified diagram showing a method for instant messaging according to one embodiment of the present invention.

FIG. 2 is a simplified diagram showing a method for instant messaging according to one embodiment of the present invention. The diagram is merely an example, which should not unduly limit the scope of the claims. One of ordinary skill in the art would recognize many variations, alternatives, and modifications. The method 200 includes at least the processes 202-204. For example, the method 100 is implemented on the terminal 120 as part of the implementation environment 100, where a user client based on an instant-messaging program is run on the terminal 120.

According to one embodiment, the process 202 includes establishing a first association relationship with at least one first apparatus client for instant messaging. For example, a user client establishes the first association relationship with at least one first apparatus client for instant messaging. In another example, the user client displays an interface of "apparatus list" as shown in FIG. 3(A).

Figure 3A:
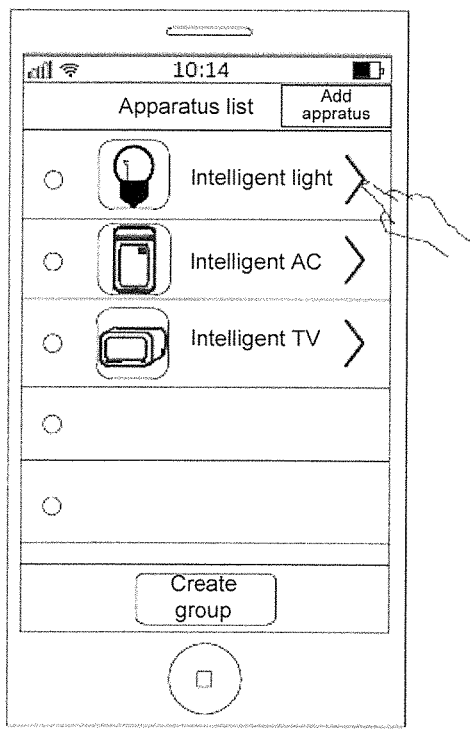
FIG. 3(A) is a simplified diagram showing an interface for an apparatus list according to one embodiment of the present invention.

FIG. 3(A) is a simplified diagram showing an interface for an apparatus list according to one embodiment of the present invention. The diagram is merely an example, which should not unduly limit the scope of the claims. One of ordinary skill in the art would recognize many variations, alternatives, and modifications.

According to one embodiment, a user client may establish an association relationship with a plurality of apparatus clients for instant messaging, which is similar to the situation where multiple friends may be added in a chat software (e.g., WeChat). For example, the association relationship may be a good-friend relationship between the user client and the apparatus client, and the user client includes a chat application program (e.g., WeChat) with an instant messaging function. In another example, the user client can establish one or more association relationships with an apparatus client connected with an intelligent electric light, an apparatus client connected with an intelligent fan, an apparatus client connected with an intelligent air-conditioner, and/or other apparatus clients connected with other intelligent household appliances for instant messaging. After these association relationship have been established, the construction of an Internet of Things based on an intelligent home system has been completed.

Referring back to FIG. 2, the process 204 includes transmitting a control instruction to the apparatus client which has the association relationship, where the control instruction is configured to trigger the apparatus client to control an intelligent apparatus connected with the apparatus client according to the control instruction to execute one or more predetermined operations, in some embodiments. For example, the user client transmits the control instruction to the apparatus client which has the association relationship, and the control instruction is configured to trigger the apparatus client to control the intelligent apparatus connected with the apparatus client according to the control instruction to execute the predetermined operation. As an example, the intelligent electric light may be turned on or off; a wind speed of the intelligent fan may be adjusted; and a time for automatic shutdown of the intelligent air-conditioner may be controlled.

Figure 3B:
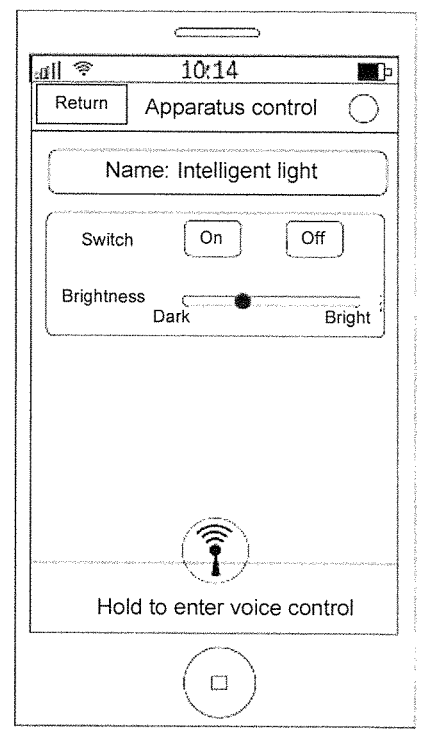
FIG. 3(B) is a simplified diagram showing an interface for apparatus control according to one embodiment of the present invention.

FIG. 3(B) is a simplified diagram showing an interface for apparatus control according to one embodiment of the present invention. The diagram is merely an example, which should not unduly limit the scope of the claims. One of ordinary skill in the art would recognize many variations, alternatives, and modifications.

As shown in FIG. 3(B), the interface of "apparatus control" is displayed by the user client, according to some embodiments. For example, the interface of "apparatus control" includes a control-instruction-input interface for an intelligent electric light. For example, a control instruction may be input in the form of a button, in the form of a text in a fixed format, in the form of a text in a non-fixed format, or in the form of voice data. For different intelligent apparatuses, corresponding control-instruction-input interfaces may be different, and the input forms of the control instructions may also be different, according to certain embodiments. As shown in FIG. 3(B), the control-instruction-input interface includes controls for turning on or off the intelligent electric light, and for adjusting brightness of the intelligent electric light, in certain embodiments.

Figure 4:
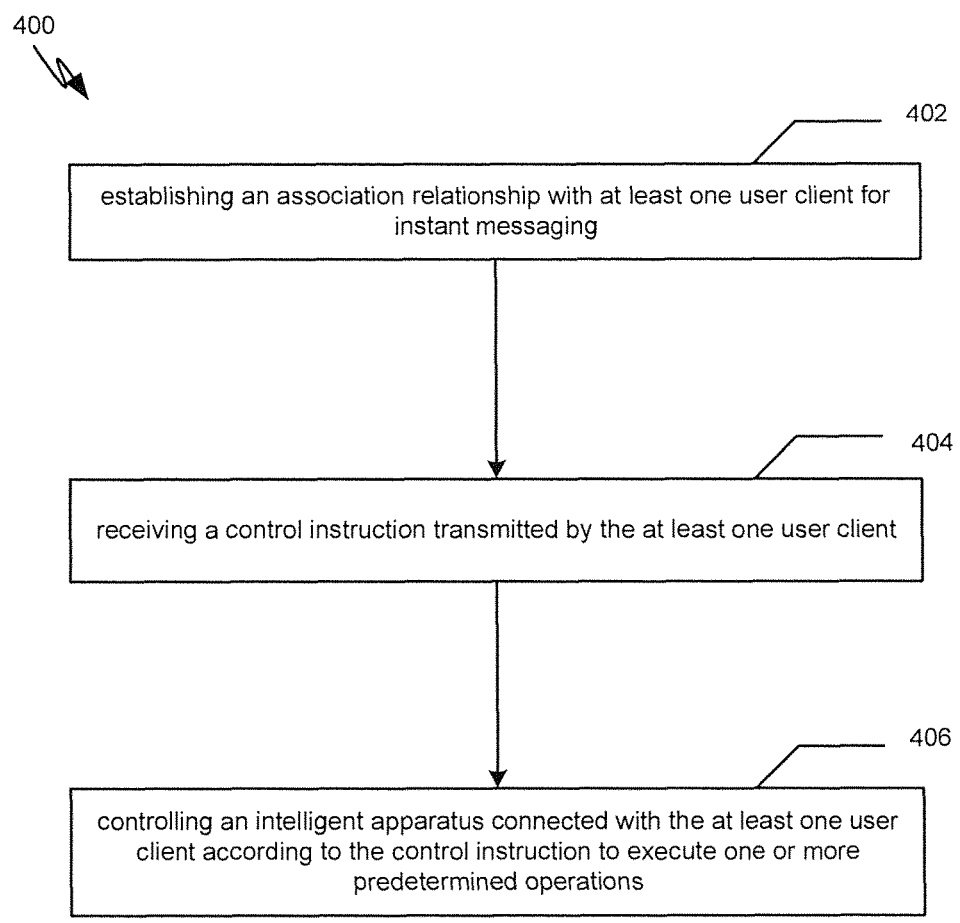
FIG. 4 is a simplified diagram showing a method for instant messaging according to another embodiment of the present invention.

FIG. 4 is a simplified diagram showing a method for instant messaging according to another embodiment of the present invention. The diagram is merely an example, which should not unduly limit the scope of the claims. One of ordinary skill in the art would recognize many variations, alternatives, and modifications. The method 400 includes at least the processes 402-406. For example, the method 400 is implemented on the instant-messaging component 160 as part of the implementation environment 100, where an apparatus client is run on the instant-messaging component 160.

According to one embodiment, the process 402 includes: establishing an association relationship with at least one apparatus client for instant messaging. For example, a user client establishes the association relationship with at least one apparatus client for instant messaging. In another example, the user client displays an interface of "apparatus list" as shown in FIG. 3(A). In yet another example, a user client may establish an association relationship with a plurality of apparatus clients for instant messaging, which is similar to the situation where in a chat software (e.g., WeChat) a user (e.g., "Dingdangmao") may be a friend of another user, and may also be a friend of other users. As an example, an intelligent home system is established for Xiao Ming's home. An apparatus client including an intelligent electric light establishes an association relationship with a user client used by Xiao Ming and also establishes another association relationship with another user client used by Xiao Ming's father.

According to another embodiment, the process 404 includes: receiving a control instruction which has been transmitted by the user client which has the association relationship. For example, the apparatus client receives the control instruction which has been transmitted by the user client which has the association relationship. In another example, the process 406 includes: controlling an intelligent apparatus, which is connected with the apparatus client, according to the control instruction to execute one or more predetermined operations. In yet another example, the apparatus client controls the intelligent apparatus, which is connected with the apparatus client, according to the control instruction to execute certain predetermined operation. The control instruction is configured to trigger the apparatus client to control the intelligent apparatus, which is connected with the apparatus client, according to the control instruction to execute the predetermined operations. In yet another example, the apparatus client is triggered to turn on or off an intelligent electric light, adjust a wind speed of an intelligent fan and/or control a time for automatic shutdown of an intelligent air-conditioner.

As shown in FIG. 3(B), the interface of "apparatus control" is displayed by the user client, according to some embodiments. For example, the interface of "apparatus control" includes a control-instruction-input interface for an intelligent electric light. For example, a control instruction may be input in the form of a button, in the form of a text in a fixed format, in the form of a text in a non-fixed format, or in the form of voice data. For different intelligent apparatuses, corresponding control-instruction-input interfaces may be different, and the input forms of the control instructions may also be different, according to certain embodiments. As shown in FIG. 3(B), the control-instruction-input interface includes controls for turning on or off the intelligent electric light, and for adjusting brightness of the intelligent electric light, in certain embodiments.

Figure 5:
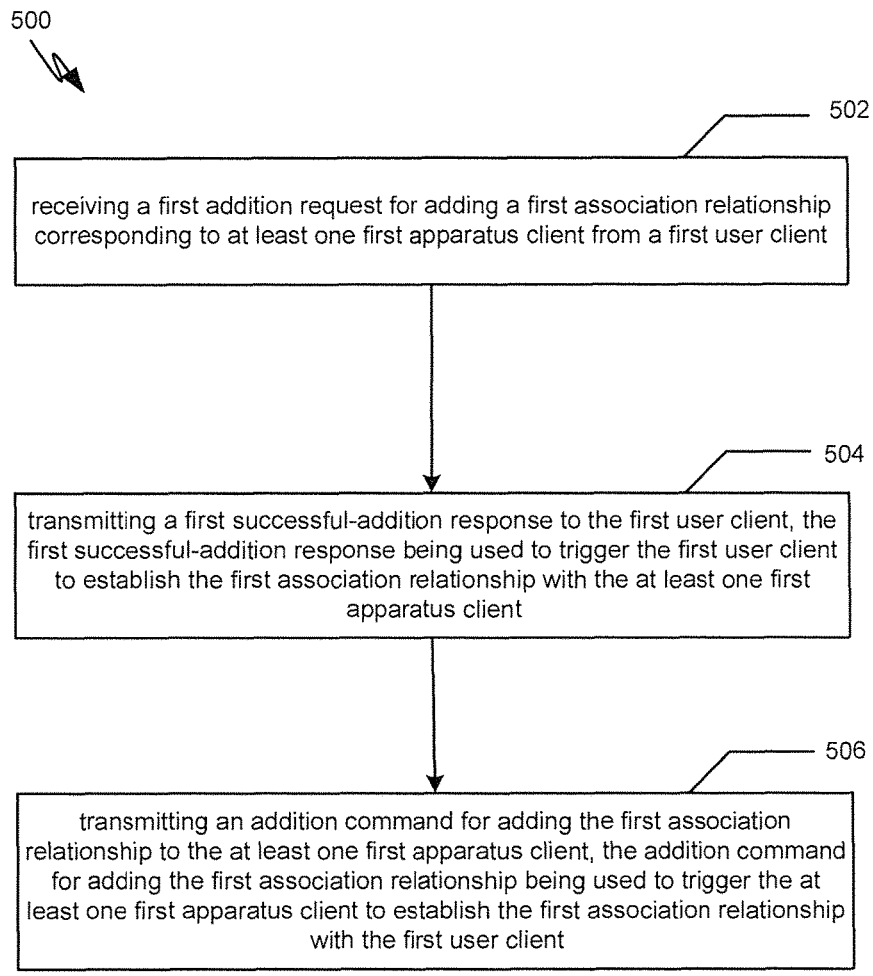
FIG. 5 is a simplified diagram showing a method for instant messaging according to yet another embodiment of the present invention.

FIG. 5 is a simplified diagram showing a method for instant messaging according to yet another embodiment of the present invention. The diagram is merely an example, which should not unduly limit the scope of the claims. One of ordinary skill in the art would recognize many variations, alternatives, and modifications. The method 500 includes at least the processes 502-506. For example, the method 500 is implemented on the server 140 as part of the implementation environment 100.

According to one embodiment, the process 502 includes: receiving a request, which has been transmitted by a user client and corresponds to one apparatus client, for an addition of an association relationship. For example, the server receives the request, which has been transmitted by the user client and corresponds to one apparatus client, for the addition of the association relationship. In another example, the user client may establish the association relationship with the apparatus relationship according to approval from the server. In yet another example, the process 504 includes: transmitting a successful-addition response to the user client, where the successful-addition response is configured to trigger the user client to establish the association relationship with the apparatus client. In yet another example, the server transmits the successful-addition response to the user client, where the successful-addition response is configured to trigger the user client to establish the association relationship with the apparatus client.

According to another embodiment, the process 506 includes: transmitting a command for the addition of the association relationship to the apparatus client, where the command for the addition of the association relationship is configured to trigger the apparatus client to establish the association relationship with the user client. For example, the server transmits the command for the addition of the association relationship to the apparatus client, where the command for the addition of the association relationship is configured to trigger the apparatus client to establish the association relationship with the user client. The processes 506 and 504 are performed approximately simultaneously, in some embodiments. The process 506 may be performed before the process 504, in certain embodiments. The process 506 may also be performed after the process 504, in some embodiments.

Figure 6:
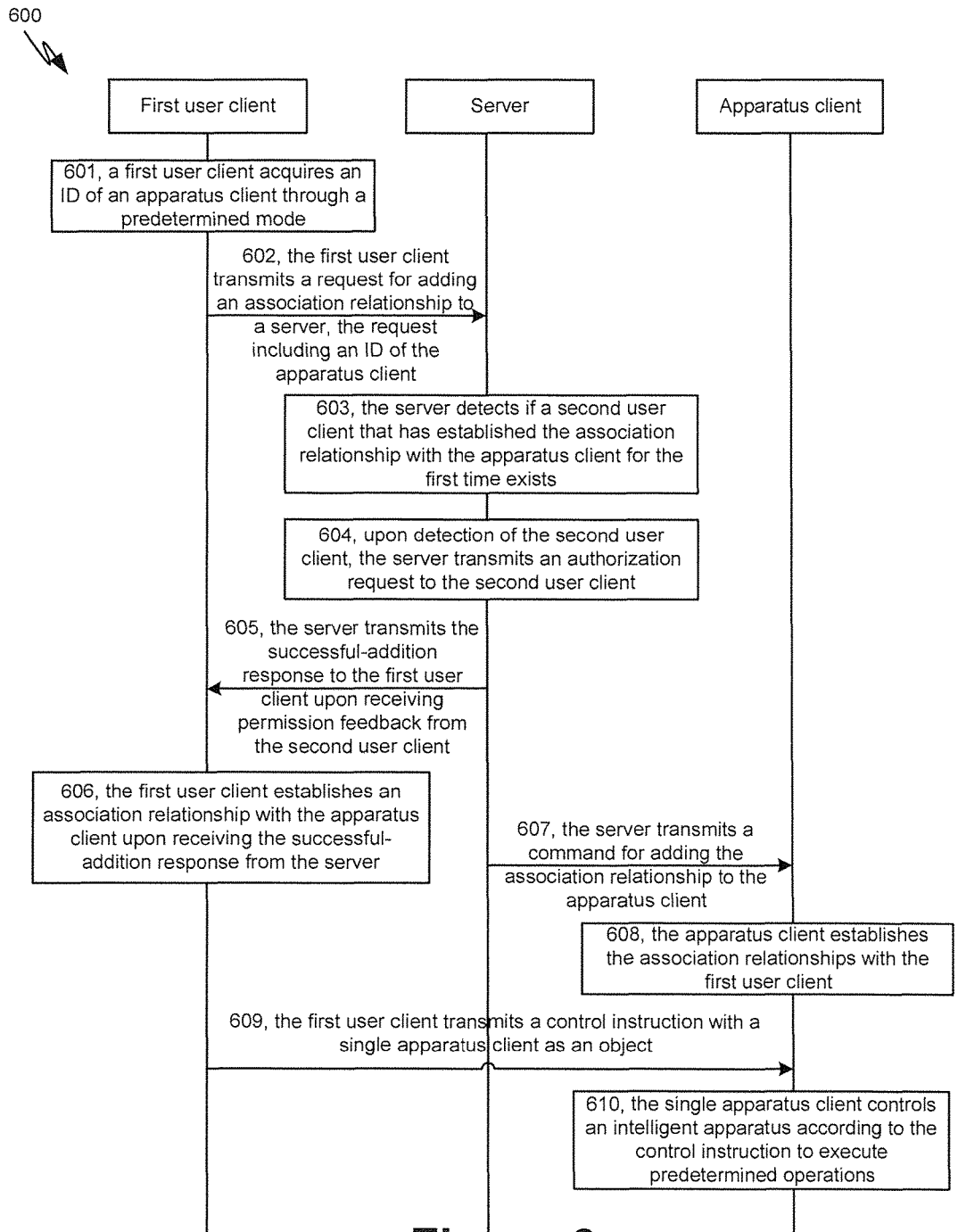
FIG. 6 is a simplified diagram showing a method for instant messaging according to yet another embodiment of the present invention.

FIG. 6 is a simplified diagram showing a method for instant messaging according to yet another embodiment of the present invention. The diagram is merely an example, which should not unduly limit the scope of the claims. One of ordinary skill in the art would recognize many variations, alternatives, and modifications. The method 600 includes at least the processes 601-610. For example, the method 600 is implemented on the implementation environment 100.

According to one embodiment, during the process 601, a first user client acquires an identification (ID) of an apparatus client through a predetermined mode. For example, the predetermined mode includes: scanning a two-dimensional code on the apparatus client, scanning a barcode on the apparatus client, receiving input texts, identifying texts on the apparatus client, and/or communicating with the apparatus client by means of a near field communication (NFC) technology. In another example, the ID includes a character string. In yet another example, the IDs of different apparatus clients are different. As an example, an ID of an apparatus client is "117417255", and a two-dimensional code is obtained through coding the ID. As another example, the first user client may acquire the ID of the apparatus client through identifying the two-dimensional code. As yet another example, an ID is directly printed on instructions of an apparatus client. As yet another example, an ID is printed on a label affixed to the apparatus client. As yet another example, a user may directly input the ID into the first user client.

According to another embodiment, during the process 602, the first user client transmits a request, which carries the ID of the apparatus client, for an addition of the association relationship to a server. For example, the request for the addition of the association relationship carries the ID of the apparatus client, and the ID of the apparatus client has been acquired by the first user client through the predetermined mode. In another example, the first user client may establish the association relationship with the apparatus relationship according to approval from the server. In yet another example, the server receives the request, which has been transmitted by the first user client and corresponds to the apparatus client, for the addition of the association relationship.

According to yet another example, during the process 603, the server detects whether a second user client that has established the association relationship with the apparatus client for the first time exists or not. For example, a corresponding privilege management mechanism is set in the system for instant messaging, and the server sets the second user client which has established the association relationship with the apparatus client for the first time, as an administrator. In another example, after the administrator, any other user client that applies to establish the association relationship with the apparatus client may be approved by the administrator prior to establishing the association relationship. In yet another example, during the process 604, upon the detection of the second user client, the server transmits an authorization request to the second user client. In yet another example, the authorization request is configured to query the second user client (i.e., the administrator) which has established the association relationship with the apparatus client for the first time whether the second user client approves the apparatus client to establish the association relationship with any other user clients.

In one embodiment, the server transmits the authorization request to the second user client which has established the association relationship with the apparatus client for the first time. For example, the second user client receives the authorization request which has been transmitted by the server, and the second user client receives an input signal of whether the authorization request is permitted. In another example, the second user client transmits permission feedback to the server if the input signal indicates the permission of the authorization request so that the server transmits the successful-addition response to other user clients after having received the permission feedback. In yet another example, the input signal indicating whether the authorization request is permitted is provided by a user of the second user client. The server directly executes the process of transmitting the successful-addition response to any other user clients that requests to establish an association relationship with the apparatus client if the second user client is not detected, i.e., there is no user client that has established an association relationship with the apparatus client for the first time, in some embodiments.

In another embodiment, during the process 605, the server executes the process of transmitting the successful-addition response to the first user client upon receiving permission feedback which has been transmitted by the second user client. For example, after the user of the second user client has approved the first user client to establish the association relationship with the apparatus client, the server transmits the successful-addition response to the first user client. In another example, the successful-addition response carries certain contents, such as a name of the apparatus client, an Internet Protocol (IP) address of the apparatus client and/or port information of the apparatus client. In yet another example, the first user client receives the successful-addition response which has been transmitted by the server.

In yet another embodiment, during the process 606, the first user client establishes an association relationship with the apparatus client upon receiving the successful-addition response which has been fed back by the server. For example, after the first user client has established the association relationships with the apparatus client, the first user client may control the apparatus client through one or more corresponding control instructions to control an intelligent apparatus which is connected with the apparatus client, according to the control instructions, to execute one or more predetermined operations.

In yet another embodiment, during the process 607, the server transmits a command for the addition of the association relationship to the apparatus client. For example, the command for the addition of the association relationship carries the ID of the first user client, and the command for the addition of the association relationship has been transmitted after the server has received the request for the addition of the association relationship. In another example, the command for the addition of the association is transmitted after the server has received the permission feedback. In yet another example, the command for the addition of the association relationship is configured to trigger the apparatus client to establish the association relationship with the first user client. In yet another example, accordingly, the apparatus client receives the command for the addition of the association relationship that is transmitted by the server.

In yet another embodiment, during the process 608, the apparatus client establishes the association relationships with the first user client. For example, the apparatus client establishes the association relationship with the first user client upon receiving the command transmitted by the server and displays related information, such as an apparatus name and an apparatus icon in an "apparatus list" of the first user client (e.g., as shown in FIG. 3(A)). The processes 607 and 608 are performed at the same time as the processes 605 and 606, in some embodiments. The processes 607 and 608 are performed before the processes 605 and 606, in certain embodiments. The processes 607 and 608 are performed after the processes 605 and 606, in some embodiments.

According to one embodiment, during the process 609, the first user client transmits a control instruction with a single apparatus client as an object. For example, the first user client may transmit the control instruction with the single apparatus as the object, or transmit one or more control instructions with a plurality of clients as an object. For example, the control instruction is configured to trigger the apparatus client to control the intelligent apparatus connected with the apparatus client according to the control instruction to execute one or more predetermined operations.

In some embodiments, the control instruction is transmitted in different manners. In a first embodiment, in response to the control instruction being in the form of a button, the control instruction is transmitted to the apparatus client directly or indirectly through the server. The control instruction may correspond to the "On" button or the "Off" button in the interface of "apparatus control" as shown in FIG. 3(B). The control instruction may be directly transmitted to the apparatus client, or may be indirectly transmitted through the server to the apparatus client. In a second embodiment, in response to the control instruction being in the form of a text in a fixed format, the control instruction is transmitted directly or indirectly through the server to the apparatus client. For the intelligent electric light, the fixed format may be set as "On," "Off," "Dark," "Bright," or other suitable formats. A user may directly input a word, such as "On," "Off," "Dark," or "Bright," which conforms to the fixed format to form the control instruction. The control instruction may be directly transmitted to the apparatus client or may be indirectly transmitted through the server to the apparatus client.

In a third embodiment, in response to certain control information being in the form of a text in a non-fixed format, the control information is analyzed to acquire a corresponding control instruction which is then transmitted directly or indirectly through the server to the apparatus client. For the intelligent electric light, the fixed format may be set as "On," "Off," "Dark," "Bright," or other suitable formats. If the control information that has been input by the user includes "please help me turn on the light," then the user client analyzes the control information through a character recognition technology, a semantic recognition technology, or other suitable technology to acquire a control instruction of "On" which may be directly transmitted to the apparatus client or may be indirectly transmitted through the server to the apparatus client. In a fourth embodiment, in response to certain control information being in the form of a text in a non-fixed format, the control information is transmitted to the server which analyzes the control information to obtain the control instruction and transmits the control instruction to the apparatus client. Based on the third embodiment, if the first user client does not have a character recognition technology, a semantic recognition technology or any other suitable technology, then the first user client transmits the received control information in the form of a text in the non-fixed format to the server. Then, the server analyzes the control information by means of a character recognition technology, a semantic recognition technology, etc. to acquire the corresponding control instruction and then transmits the corresponding control instruction to the apparatus client.

In a fifth embodiment, in response to certain control information in the form of voice data, the control information is analyzed to acquire a corresponding control instruction and the control instruction is transmitted directly or indirectly through the server to the apparatus client. For the intelligent electric light, if the user says "please help me turn on the light," then the first user client analyzes the control information of "please help me turn on the light" by means of a character recognition technology, a semantic recognition technology, etc. to acquire the corresponding control instruction. The control instruction may be directly transmitted to the apparatus client or may be indirectly transmitted through the server to the apparatus client. In a sixth embodiment, in response to certain control information in the form of voice data, the control information is transmitted to the server which analyzes the control information to obtain a corresponding control instruction and transmits the control instruction to the apparatus client. Based on the fifth embodiment, if the first user client does not have a semantic analysis technology, a semantic extraction technology, or any other suitable technology, then the first user client may transmit the control information in the form of voice data to the server. The server analyzes the control information by means of a semantic analysis technology, a semantic extraction technology, or any other suitable technology to acquire the corresponding control instruction and then transmits the corresponding control instruction to the apparatus client. Accordingly, the apparatus client receives the control instruction which has been transmitted by the first user client which has the association relationship with the apparatus client.

In the first embodiment, the apparatus client receives the control instruction which has been directly transmitted by the first user client, and the control instruction has been transmitted when the first user client has received the control instruction which has been input in the form of a button. Or the apparatus client receives the control instruction which has been indirectly forwarded by the first user client through the server, and the control instruction has been forwarded after the first user client has received the control instruction which has been input in the form of a button.

In the second embodiment, the apparatus client receives the control instruction which has been directly transmitted by the first user client, and the control instruction has been transmitted when the first user client has received the control instruction which has been input in the form of text which conforms to the fixed format. Or the apparatus client receives the control instruction which has been indirectly forwarded by the first user client through the server, and the control instruction has been forwarded after the first user client has received the control instruction which has been transmitted by the first user client and input in the form of button which conforms to the fixed format.

In the third embodiment, the apparatus client receives the control instruction which has been directly transmitted by the first user client, and the control instruction has been transmitted after the first user client has received the control instruction, which has been input in the form of text which is in the non-fixed format, and analyzed the control information to acquire the corresponding control instruction. Or the apparatus client receives the control instruction which has been indirectly forwarded by the first user client through the server, and the control instruction has been acquired after the first user client has received the control instruction, which has been input in the form of text which is in the non-fixed format, and analyzed the control information.

In the fourth embodiment, the apparatus client receives the control instruction which has been forwarded by the first user client through the server, and the control instruction has been forwarded after the server has received the control instruction, which has been input in the form of text which is in the non-fixed format, and analyzed the control information to acquire the corresponding control instruction.

In the fifth embodiment, the apparatus client receives the control instruction which has been directly transmitted by the first user client, and the control instruction has been transmitted after the first user client has received the control instruction, which has been input in the form of voice, and analyzed the control information by means of voice recognition to acquire the corresponding control instruction. Or the apparatus client receives the control instruction which has been indirectly forwarded by the first user client through the server, and the control instruction has been acquired after the first user client has received the control instruction, which has been input in the form of voice, and analyzed the control information by means of voice recognition.

In the sixth embodiment, the apparatus client receives the control instruction which has been forwarded by the first user client through the server, and the control instruction has been forwarded after the server has received the control instruction, which has been input in the form of voice, and analyzed the control information by means of voice recognition to acquire the corresponding control instruction.

In certain embodiment, during the process 610, the single apparatus client controls an intelligent apparatus connected with the apparatus client according to the control instruction to execute one or more predetermined operations. Using the intelligent electric light as an example, after the apparatus client that is connected with the intelligent electric light has received the control instruction of "On," the apparatus client controls the switch of the intelligent electric light, and then the intelligent electric light is turned on. For example, the single apparatus client is connected with a single intelligent apparatus. In another example, the apparatus client is connected with a traditional apparatus through a predetermined interface to form an intelligent apparatus. In yet another example, the apparatus client is connected with a plurality of traditional apparatuses through a plurality of predetermined interfaces to form an intelligent apparatus cluster. In yet another example, the plurality of traditional apparatuses have identical or similar functions. For example, a row of identical light bulbs are connected with a same apparatus client through a plurality of predetermined interfaces to form an intelligent light bulb cluster. Then the first user client controls the apparatus client to control switches or brightness of the row of light bulbs at the same time, in certain embodiments.

Figure 7A:
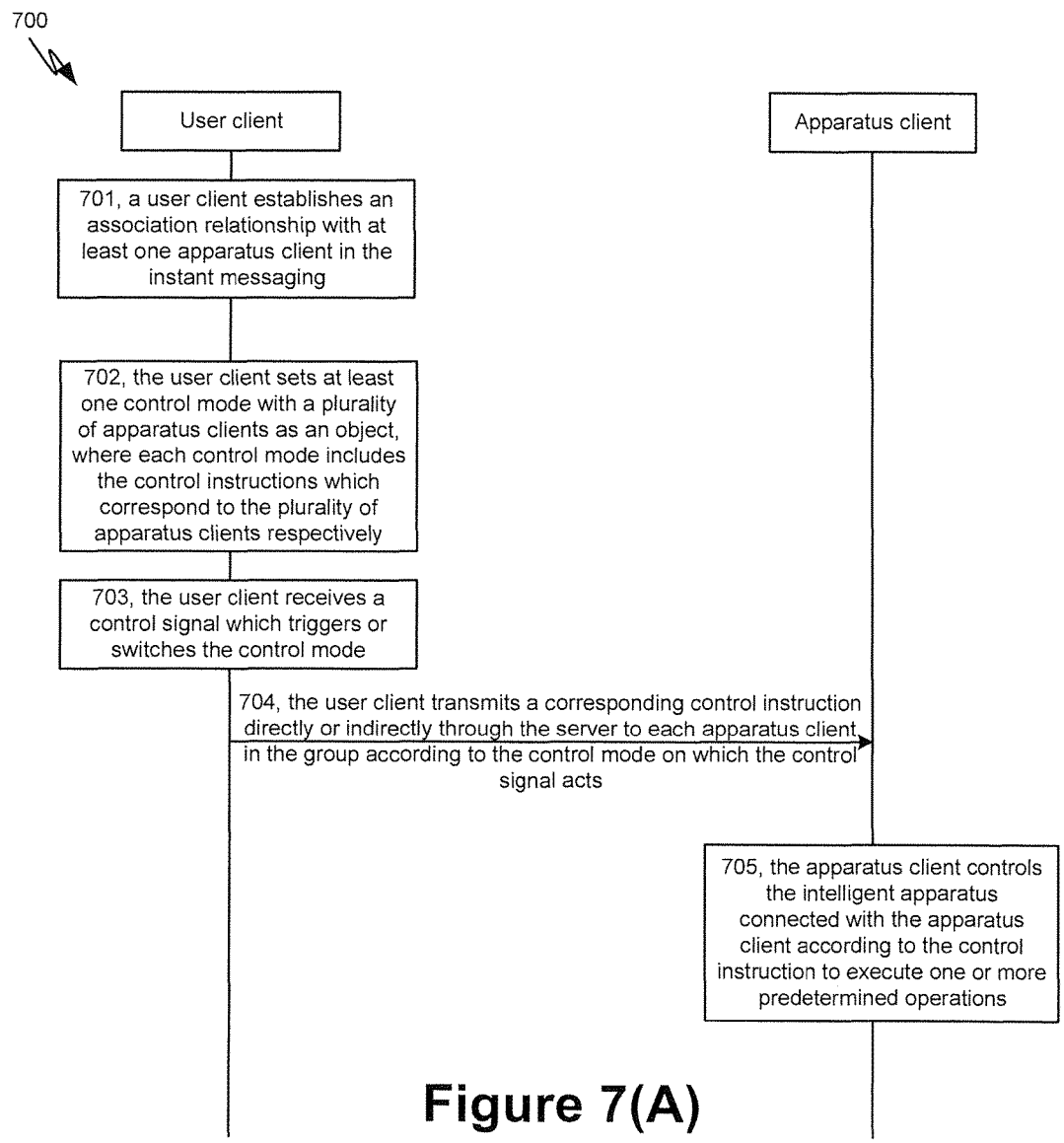
FIG. 7(A) is a simplified diagram showing a method for instant messaging according to yet another embodiment of the present invention.

FIG. 7(A) is a simplified diagram showing a method for instant messaging according to yet another embodiment of the present invention. The diagram is merely an example, which should not unduly limit the scope of the claims. One of ordinary skill in the art would recognize many variations, alternatives, and modifications. The method 700 includes at least the processes 701-705. For example, the method 700 is implemented on the implementation environment 100.

According to one embodiment, during the process 701, a user client establishes an association relationship with at least one apparatus client in the instant messaging. For example, the user client is installed with an application program which has an instant messaging function, and after the user client has established the association relationship with the apparatus client in the instant messaging, the user client displays the interface of "apparatus list" as shown in FIG. 3(A). In another example, a single apparatus client may establish the association relationship with a plurality of user clients in the instant messaging, which is similar to the situation where multiple friends may be added in a chat software (e.g., WeChat). In another example, the user client can establish one or more association relationships with an apparatus client connected with an intelligent electric light, an apparatus client connected with an intelligent fan, an apparatus client connected with an intelligent air-conditioner, and/or other apparatus clients connected with other intelligent household appliances for instant messaging. After these association relationship have been established, the construction of an Internet of Things based on an intelligent home system has been completed. In yet another example, after the user client has established the association relationship with the apparatus client, the user client may control the apparatus client through a corresponding control instruction to control an intelligent apparatus connected with the apparatus client according to the control instruction to execute one or more predetermined operations. The process 701 includes the processes 601-608, in some embodiments.

According to another embodiment, during the process 702, the user client sets at least one control mode with a plurality of apparatus clients as an object, where each control mode includes the control instructions which correspond to the plurality of apparatus clients respectively. For example, a plurality of apparatus clients may be established as one group, which is similar to the situation where multiple good friends may be established as one group in a chat software (e.g., WeChat). After the establishment of the group, all the good friends in the group may receive information transmitted to the group. After the user client has completed the establishment of the group and appropriately set the control mode which corresponds to the group, the user selects the control mode, and then each apparatus client in the group receives a corresponding control instruction. As an example, using an intelligent home system as an example, two groups are established. One group is a monitoring apparatus group including certain apparatuses, such as an intelligent monitor and an intelligent camera. The other group is a non-monitoring apparatus group including certain apparatuses, such as an intelligent electric light, an intelligent fan, an intelligent air-conditioner, and an intelligent TV.

Figure 7B:
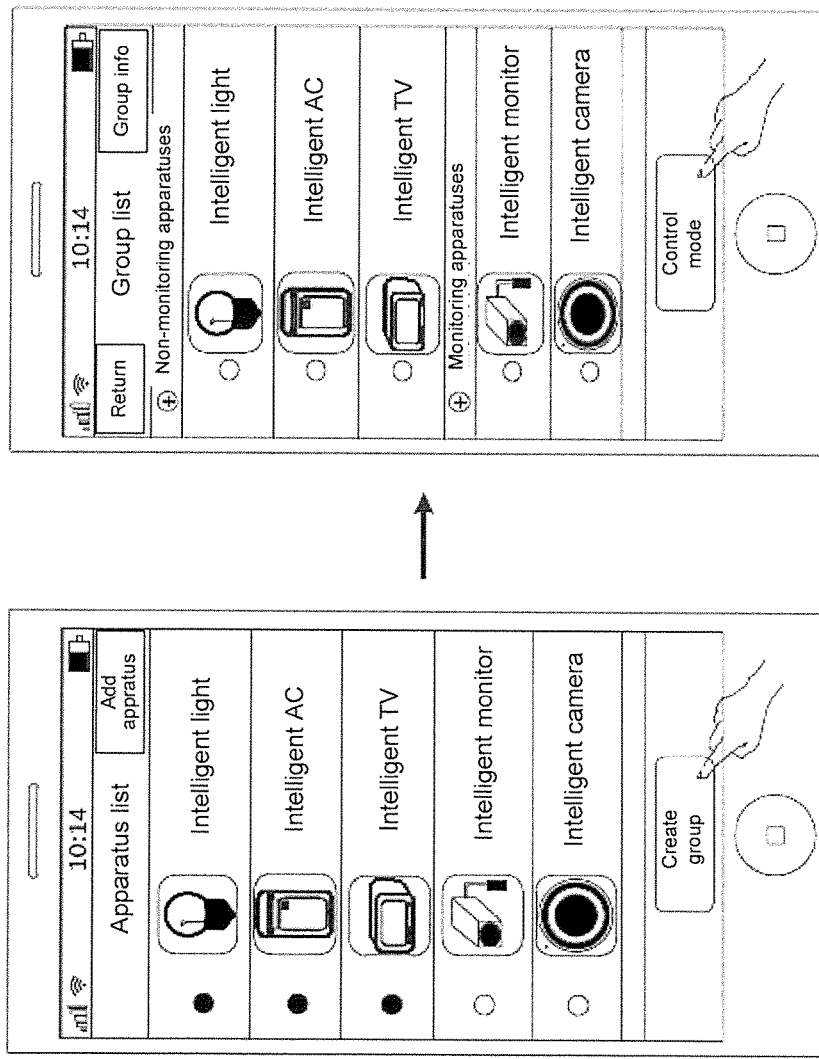
FIG. 7(B) is a simplified diagram showing an interface for a group list according to one embodiment of the present invention.

FIG. 7(B) is a simplified diagram showing an interface for a group list according to one embodiment of the present invention. The diagram is merely an example, which should not unduly limit the scope of the claims. One of ordinary skill in the art would recognize many variations, alternatives, and modifications.

According to one embodiment, two modes are set, where a first mode is an away mode, and a second mode is a stay mode. For example, in the "away mode," all intelligent apparatuses in the monitoring apparatus group are on, and all intelligent apparatuses in the non-monitoring apparatus group are off. In another example, in the "stay mode," all intelligent apparatuses in the monitoring apparatus group are off, and all intelligent apparatuses in the non-monitoring apparatus group are on.

Figure 7C:
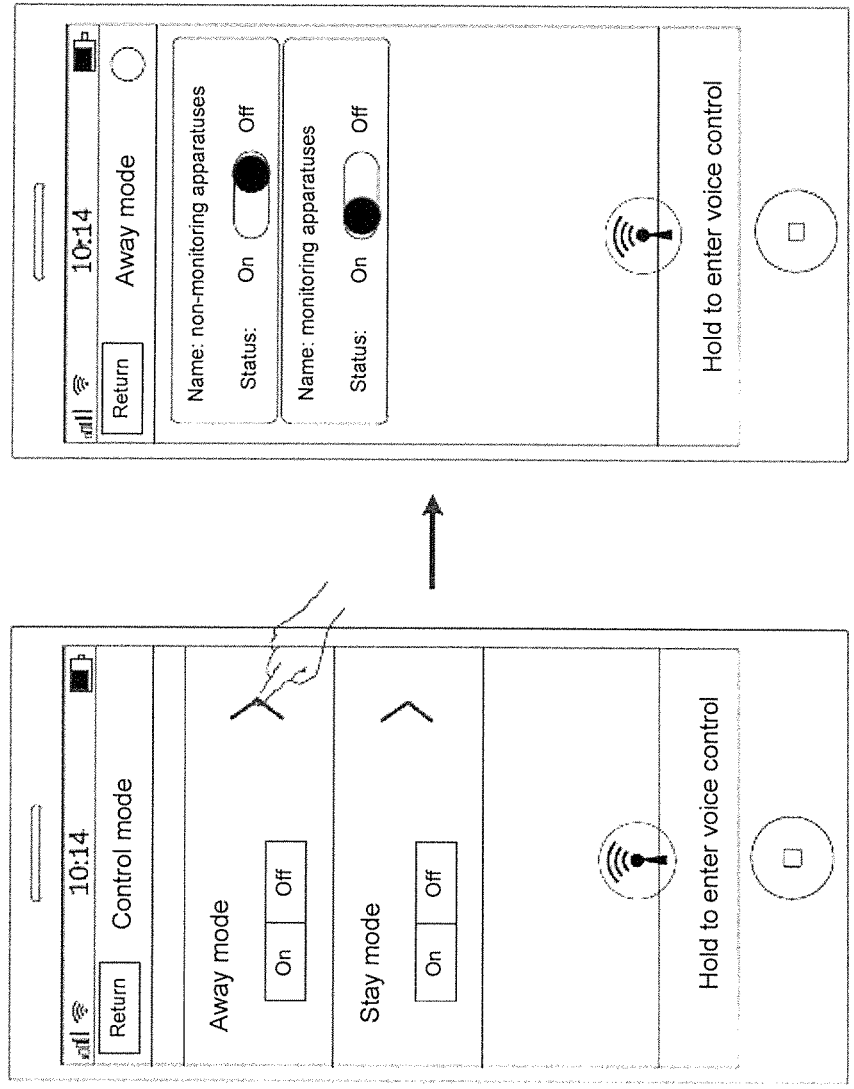
FIG. 7(C) is a simplified diagram showing an interface for control modes and an interface for an away mode according to one embodiment of the present invention.

FIG. 7(C) is a simplified diagram showing an interface for control modes and an interface for an away mode according to one embodiment of the present invention. The diagram is merely an example, which should not unduly limit the scope of the claims. One of ordinary skill in the art would recognize many variations, alternatives, and modifications.

Referring back to FIG. 7(A), a control instruction is configured to trigger an apparatus client to control an intelligent apparatus connected with the apparatus client according to the control instruction to execute one or more predetermined operations, in some embodiments. For example, during the process 703, the user client receives a control signal which triggers or switches the control mode. As an example, when a user goes out for work in the morning, the control signal of the "away mode" is triggered. As another example, when the user has arrived home from work in the evening, the "stay mode" is switched on. In another example, during the process 704, the user client transmits a corresponding control instruction directly or indirectly through the server to each apparatus client in the group according to the control mode on which the control signal acts. In yet another example, after the user client has completed the establishment of the group and appropriately set the control mode which corresponds to the group, the user selects the control mode, and then each apparatus client in the group will receive the corresponding control instruction. The control instruction may be directly transmitted to the apparatus client or may be indirectly transmitted through the server to the apparatus client. Accordingly, the apparatus client receives the corresponding control instruction.

According to another embodiment, during the process 705, the apparatus client controls the intelligent apparatus connected with the apparatus client according to the control instruction to execute one or more predetermined operations. For instance, when the control signal of the "away mode" is triggered, each apparatus client in the monitoring apparatus group receives the control instruction for switching on the corresponding monitoring apparatus, and each apparatus client in the monitoring apparatus group controls the intelligent apparatus connected with the apparatus client to be turned on according to the control instruction. In another example, each apparatus client in the non-monitoring apparatus group receives the control instruction for switching off the corresponding non-monitoring apparatus, and each apparatus client in the non-monitoring apparatus group controls the intelligent apparatus connected with the apparatus client to be turned off according to the control instruction.

Figure 8:
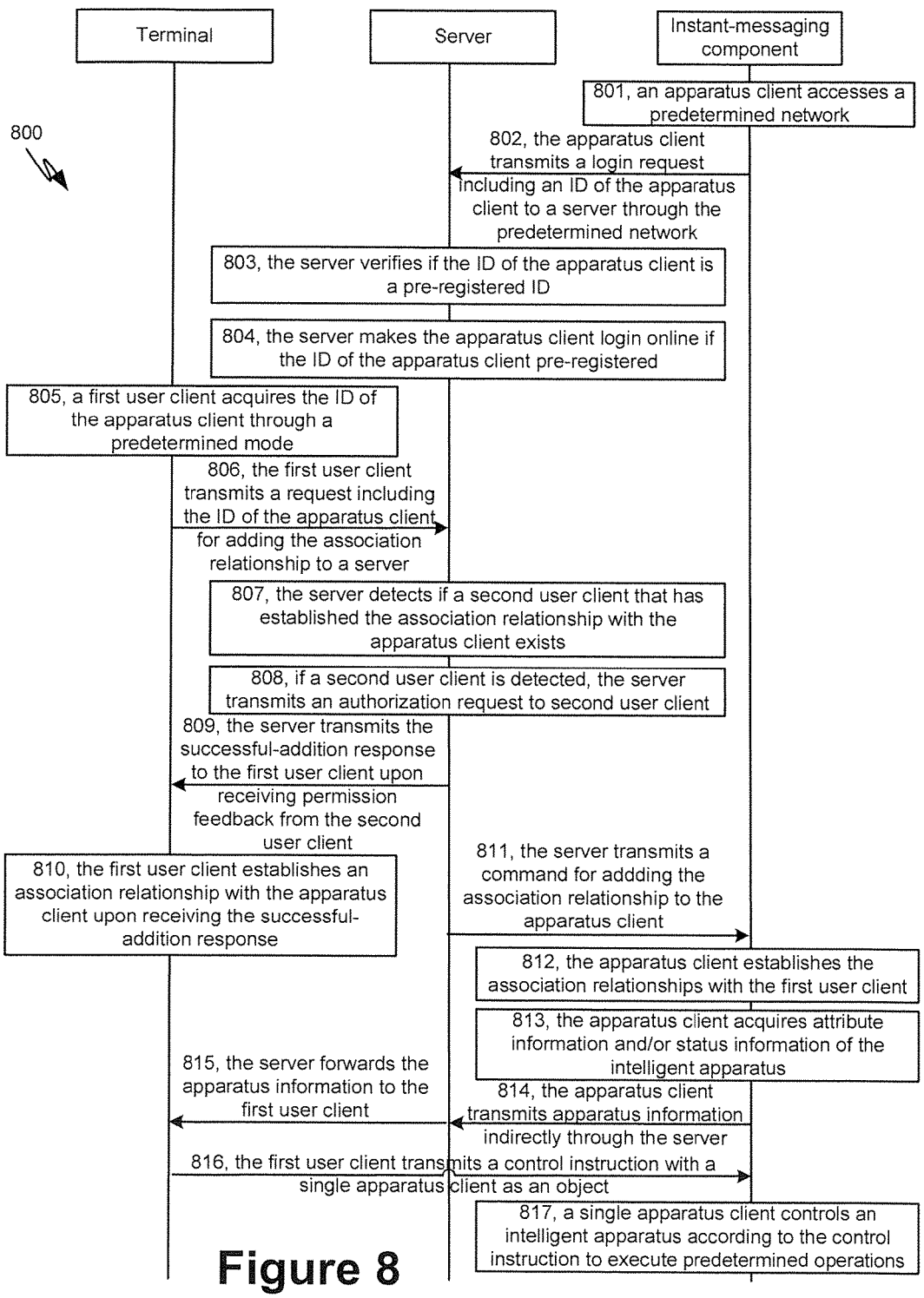
FIG. 8 is a simplified diagram showing a method for instant messaging according to yet another embodiment of the present invention.

FIG. 8 is a simplified diagram showing a method for instant messaging according to yet another embodiment of the present invention. The diagram is merely an example, which should not unduly limit the scope of the claims. One of ordinary skill in the art would recognize many variations, alternatives, and modifications. The method 800 includes at least the processes 801-817. For example, the method 800 is implemented on the implementation environment 100.

According to one embodiment, during the process 801, an apparatus client accesses a predetermined network. For example, the predetermined network includes a Wireless-Fidelity (WIFI) network, a 3rd-Generation-Partnership-Project (3GPP) network, a 4G network, a Wireless LAN (WLAN) network, a wired network, and so on. As an example, the predetermined network includes a WIFI network or a mobile network with high transmission rates for convenience. In another example, during the process 802, the apparatus client transmits a login request, which carries an ID of the apparatus client, to a server through the predetermined network. In yet another example, the ID includes a character string. In yet another example, the IDs of different apparatus clients are different. In yet another example, the ID has been pre-registered in the server when the apparatus client leaves the factory. Accordingly, the server receives the login request which carries the ID of the apparatus client and has been transmitted by the apparatus client through the predetermined network.

According to another embodiment, during the process 803, the server verifies whether the ID of the apparatus client is a pre-registered ID or not. For example, the server verifies whether the ID of the apparatus client is the pre-registered ID or not so as to judge whether the apparatus client is an apparatus client in a system for instant messaging. In another example, during the process 804, the server makes the apparatus client log in to an online status for instant messaging if the verification result shows that the ID of the apparatus client is the pre-registered ID. In yet another example, the apparatus client may complete the process 805 and subsequent operations after the apparatus client logs in to an online status for instant messaging. In yet another example, during the process 805, a first user client acquires the ID of the apparatus client through a predetermined mode. As an example, the predetermined mode includes: scanning a two-dimensional code on the apparatus client, scanning a barcode on the apparatus client, receiving input texts, identifying texts on the apparatus client, and/or communicating with the apparatus client by means of a near field communication (NFC) technology. As another example, an ID of an apparatus client is "117417255", and a two-dimensional code is obtained through coding the ID. As another example, the first user client may acquire the ID of the apparatus client through identifying the two-dimensional code. As yet another example, an ID is directly printed on instructions of an apparatus client. As yet another example, an ID is printed on a label affixed to the apparatus client. As yet another example, a user may directly input the ID into the first user client.

According to yet another embodiment, during the process 806, the first user client transmits a request, which carries the ID of the apparatus client, for an addition of the association relationship to a server. For example, the request for the addition of the association relationship carries the ID of the apparatus client, and the ID of the apparatus client has been acquired by the first user client through the predetermined mode. In another example, the first user client may establish the association relationship with the apparatus relationship according to approval from the server. Accordingly, the server receives the request, which carries the ID of the apparatus client and has been transmitted by the first user client, for the addition of the association relationship. In yet another example, during the process 807, the server detects whether a second user client that has established the association relationship with the apparatus client for the first time exists or not. In yet another example, a corresponding privilege management mechanism is set in a system for instant messaging, and the server sets the second user client that has established the association relationship with the apparatus client for the first time as an administrator. In yet another example, the first user client that applies to establish the association relationship with the apparatus client needs to be approved by the administrator prior to establishing the association relationship.

In one embodiment, during the process 808, in response to the second user client being detected, the server transmits an authorization request to the second user client. For example, the authorization request is configured to query whether the second user client (i.e., the administrator) approves the apparatus client to establish the association relationship with other user clients.

In another embodiment, the server transmits the authorization request to the second user client which has established the association relationship with the apparatus client for the first time. For example, the second user client receives the authorization request which has been transmitted by the server, and the second user client receives an input signal of whether the authorization request is permitted. In another example, the second user client transmits permission feedback to the server if the input signal indicates the permission of the authorization request so that the server transmits the successful-addition response to other user clients after having received the permission feedback. In yet another example, the input signal indicating whether the authorization request is permitted is provided by a user of the second user client. The server directly executes the process of transmitting the successful-addition response to any other user clients that requests to establish an association relationship with the apparatus client if the second user client is not detected, i.e., there is no user client that has established an association relationship with the apparatus client for the first time, in some embodiments.

In yet another embodiment, during the process 809, the server executes the process of transmitting the successful-addition response to the first user client upon receiving permission feedback which has been transmitted by the second user client. For example, after the user of the second user client has approved the first user client to establish the association relationship with the apparatus client, the server transmits the successful-addition response to the first user client. In another example, the successful-addition response carries certain contents, such as a name of the apparatus client, an Internet Protocol (IP) address of the apparatus client and/or port information of the apparatus client. In yet another example, the first user client receives the successful-addition response which has been transmitted by the server.

In yet another embodiment, during the process 810, the first user client establishes an association relationship with the apparatus client upon receiving the successful-addition response which has been fed back by the server. For example, after the first user client has established the association relationships with the apparatus client, the first user client may control the apparatus client through one or more corresponding control instructions to control an intelligent apparatus which is connected with the apparatus client, according to the control instructions, to execute one or more predetermined operations. In another example, during the process 811, the server transmits a command for the addition of the association relationship to the apparatus client. For example, the command for the addition of the association relationship carries the ID of the first user client, and the command for the addition of the association relationship has been transmitted after the server has received the request for the addition of the association relationship. In another example, the command for the addition of the association is transmitted after the server has received the permission feedback. In yet another example, the command for the addition of the association relationship is configured to trigger the apparatus client to establish the association relationship with the first user client. In yet another example, accordingly, the apparatus client receives the command for the addition of the association relationship that is transmitted by the server.

According to one embodiment, during the process 812, the apparatus client establishes the association relationships with the first user client. For example, the apparatus client establishes the association relationship with the first user client upon receiving the command transmitted by the server and displays related information, such as an apparatus name and an apparatus icon in an "apparatus list" of the first user client (e.g., as shown in FIG. 3(A)). The processes 811 and 812 are executed at the same time as the processes 809 and 810 in some embodiments. The processes 811 and 812 are executed before the processes 809 and 810 in certain embodiments. The processes 811 and 812 are executed after the processes 809 and 810, in some embodiments.

According to another embodiment, during the process 813, the apparatus client acquires attribute information and/or status information of the intelligent apparatus connected with the apparatus client. For example, the attribute information of the intelligent apparatus includes: a name, a type and/or a geographic location of the intelligent apparatus. In another example, the status information of the intelligent apparatus includes an On/Off status, a brightness status, a wind speed status, a sound volume status, and/or a video image of the intelligent apparatus. For different intelligent apparatuses, the attribute information and the status information are different in certain embodiments.

According to yet another embodiment, during the process 814, the apparatus client forwards the apparatus information indirectly through the server, where the apparatus information includes the attribute information and/or the status information of the intelligent apparatus. Accordingly, the server receives the apparatus information which has been transmitted by the apparatus client. For example, the apparatus client directly transmits the apparatus information to the first user client or the apparatus client transmits the apparatus information indirectly through the server.

According to yet another embodiment, during the process 815, the server forwards the apparatus information to the first user client which has the association relationship with the apparatus client. Accordingly, the first user client receives the apparatus information which has been forwarded indirectly by the server. For example, during the process 816, the first user client transmits a control instruction with a single apparatus client as an object. For example, the first user client may transmit the control instruction with the single apparatus as the object, or transmit one or more control instructions with a plurality of clients as an object. For example, the control instruction is configured to trigger the apparatus client to control the intelligent apparatus connected with the apparatus client according to the control instruction to execute one or more predetermined operations.

In some embodiments, the control instruction is transmitted in different manners. In a first embodiment, in response to the control instruction being in the form of a button, the control instruction is transmitted to the apparatus client directly or indirectly through the server. The control instruction may correspond to the "On" button or the "Off" button in the interface of "apparatus control" as shown in FIG. 3(B). The control instruction may be directly transmitted to the apparatus client, or may be indirectly transmitted through the server to the apparatus client. In a second embodiment, in response to the control instruction being in the form of a text in a fixed format, the control instruction is transmitted directly or indirectly through the server to the apparatus client. For the intelligent electric light, the fixed format may be set as "On," "Off," "Dark," "Bright," or other suitable formats. A user may directly input a word, such as "On," "Off," "Dark," or "Bright," which conforms to the fixed format to form the control instruction. The control instruction may be directly transmitted to the apparatus client or may be indirectly transmitted through the server to the apparatus client.

In a third embodiment, in response to certain control information being in the form of a text in a non-fixed format, the control information is analyzed to acquire a corresponding control instruction which is then transmitted directly or indirectly through the server to the apparatus client. For the intelligent electric light, the fixed format may be set as "On," "Off," "Dark," "Bright," or other suitable formats. If the control information that has been input by the user includes "please help me turn on the light," then the user client analyzes the control information through a character recognition technology, a semantic recognition technology, or other suitable technology to acquire a control instruction of "On" which may be directly transmitted to the apparatus client or may be indirectly transmitted through the server to the apparatus client. In a fourth embodiment, in response to certain control information being in the form of a text in a non-fixed format, the control information is transmitted to the server which analyzes the control information to obtain the control instruction and transmits the control instruction to the apparatus client. Based on the third embodiment, if the first user client does not have a character recognition technology, a semantic recognition technology or any other suitable technology, then the first user client transmits the received control information in the form of a text in the non-fixed format to the server. Then, the server analyzes the control information by means of a character recognition technology, a semantic recognition technology, etc. to acquire the corresponding control instruction and then transmits the corresponding control instruction to the apparatus client.

In a fifth embodiment, in response to certain control information in the form of voice data, the control information is analyzed to acquire a corresponding control instruction and the control instruction is transmitted directly or indirectly through the server to the apparatus client. For the intelligent electric light, if the user says "please help me turn on the light," then the first user client analyzes the control information of "please help me turn on the light" by means of a character recognition technology, a semantic recognition technology, etc. to acquire the corresponding control instruction. The control instruction may be directly transmitted to the apparatus client or may be indirectly transmitted through the server to the apparatus client. In a sixth embodiment, in response to certain control information in the form of voice data, the control information is transmitted to the server which analyzes the control information to obtain a corresponding control instruction and transmits the control instruction to the apparatus client. Based on the fifth embodiment, if the first user client does not have a semantic analysis technology, a semantic extraction technology, or any other suitable technology, then the first user client may transmit the control information in the form of voice data to the server. The server analyzes the control information by means of a semantic analysis technology, a semantic extraction technology, or any other suitable technology to acquire the corresponding control instruction and then transmits the corresponding control instruction to the apparatus client. Accordingly, the apparatus client receives the control instruction which has been transmitted by the first user client which has the association relationship with the apparatus client.

In the first embodiment, the apparatus client receives the control instruction which has been directly transmitted by the first user client, and the control instruction has been transmitted when the first user client has received the control instruction which has been input in the form of a button. Or the apparatus client receives the control instruction which has been indirectly forwarded by the first user client through the server, and the control instruction has been forwarded after the first user client has received the control instruction which has been input in the form of a button.

In the second embodiment, the apparatus client receives the control instruction which has been directly transmitted by the first user client, and the control instruction has been transmitted when the first user client has received the control instruction which has been input in the form of text which conforms to the fixed format. Or the apparatus client receives the control instruction which has been indirectly forwarded by the first user client through the server, and the control instruction has been forwarded after the first user client has received the control instruction which has been transmitted by the first user client and input in the form of button which conforms to the fixed format.

In the third embodiment, the apparatus client receives the control instruction which has been directly transmitted by the first user client, and the control instruction has been transmitted after the first user client has received the control instruction, which has been input in the form of text which is in the non-fixed format, and analyzed the control information to acquire the corresponding control instruction. Or the apparatus client receives the control instruction which has been indirectly forwarded by the first user client through the server, and the control instruction has been acquired after the first user client has received the control instruction, which has been input in the form of text which is in the non-fixed format, and analyzed the control information.

In the fourth embodiment, the apparatus client receives the control instruction which has been forwarded by the first user client through the server, and the control instruction has been forwarded after the server has received the control instruction, which has been input in the form of text which is in the non-fixed format, and analyzed the control information to acquire the corresponding control instruction.

In the fifth embodiment, the apparatus client receives the control instruction which has been directly transmitted by the first user client, and the control instruction has been transmitted after the first user client has received the control instruction, which has been input in the form of voice, and analyzed the control information by means of voice recognition to acquire the corresponding control instruction. Or the apparatus client receives the control instruction which has been indirectly forwarded by the first user client through the server, and the control instruction has been acquired after the first user client has received the control instruction, which has been input in the form of voice, and analyzed the control information by means of voice recognition.

In the sixth embodiment, the apparatus client receives the control instruction which has been forwarded by the first user client through the server, and the control instruction has been forwarded after the server has received the control instruction, which has been input in the form of voice, and analyzed the control information by means of voice recognition to acquire the corresponding control instruction.

According to one embodiment, during the process 817, the single apparatus client controls an intelligent apparatus connected with the apparatus client according to the control instruction to execute one or more predetermined operations. Using the intelligent electric light as an example, after the apparatus client that is connected with the intelligent electric light has received the control instruction of "On," the apparatus client controls the switch of the intelligent electric light, and then the intelligent electric light is turned on. For example, the single apparatus client is connected with a single intelligent apparatus. In another example, the apparatus client is connected with a traditional apparatus through a predetermined interface to form an intelligent apparatus. In yet another example, the apparatus client is connected with a plurality of traditional apparatuses through a plurality of predetermined interfaces to form an intelligent apparatus cluster. In yet another example, the plurality of traditional apparatuses have identical or similar functions. For example, a row of identical light bulbs are connected with a same apparatus client through a plurality of predetermined interfaces to form an intelligent light bulb cluster. Then the first user client controls the apparatus client to control switches or brightness of the row of light bulbs at the same time, in certain embodiments.

According to another embodiment, the first user client may further set at least one control mode with a plurality of apparatus clients as the object, and each control mode includes the control instructions which correspond to the plurality of apparatus clients respectively. For example, the first user client transmits the control instruction directly or indirectly through the server to each apparatus client in the group so as to realize the effect of controlling a plurality of intelligent apparatuses at the same time. As an example, Xiao Ming buys a new intelligent pet feeder which is equipped with a component for instant messaging. As the new intelligent pet feeder bought by Xiao Ming is also equipped with a camera, the intelligent pet feeder may not only realize an automatic feeding function but also satisfy the user's need to control the amount of food for feeding when monitoring the feeding process. When Xiao Ming goes home, Xiao Ming turns on a mobile phone installed with an application program which has an instant messaging function, enters an interface of "add an apparatus" and receives a prompt to acquire a two-dimensional code of the apparatus client. Xiao Ming establishes an association relationship between the mobile phone and the intelligent pet feeder by means of scanning the two-dimensional code on the surface of the packaging box of the intelligent pet feeder. Next day, Xiao Ming goes out to work. Instead of returning home at noon as usual to feed the pet dog, Xiao Ming turns on the mobile phone in Xiao Ming's workplace to remotely control the intelligent pet feeder to feed the pet dog. Specifically, Xiao Ming turns on the mobile phone, and enters the application program which has the instant messaging function. Then Xiao Ming enters an interface of "apparatus list," and clicks the "intelligent pet feeder" to enter an interface of "apparatus control." Xiao Ming activates the camera function of the intelligent pet feeder, sets the food feeding amount appropriately and presses a button of "start feeding." Then, Xiao Ming can stay in office and monitor the feeding process during which the pet dog enjoys lunch at home.

Figure 9:
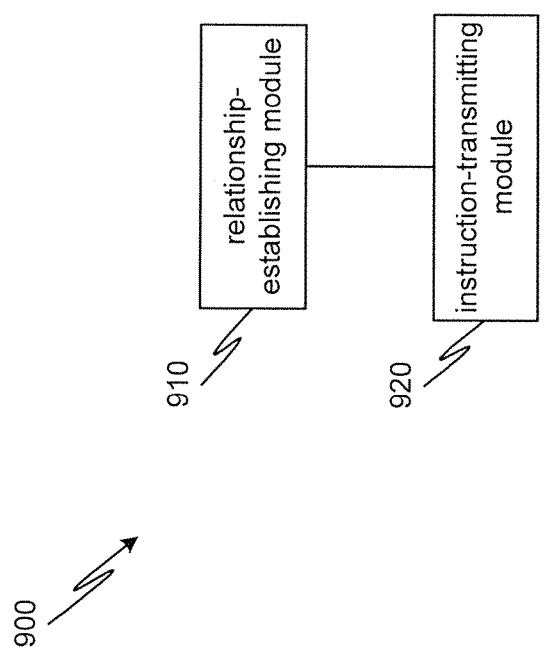
FIG. 9 is a simplified diagram showing a user client for instant messaging according to one embodiment of the present invention.

FIG. 9 is a simplified diagram showing a user client for instant messaging according to one embodiment of the present invention. The diagram is merely an example, which should not unduly limit the scope of the claims. One of ordinary skill in the art would recognize many variations, alternatives, and modifications. The user client 900 includes: a relationship-establishing module 910 and an instruction-transmitting module 920.

According to one embodiment, the relationship-establishing module 910 is configured to establish an association relationship with at least one apparatus client in instant messaging. For example, the instruction-transmitting module 920 is configured to transmit a control instruction to the apparatus client with has the association relationship, and the control instruction is configured to trigger the apparatus client to control an intelligent apparatus, which is connected with the apparatus client, according to the control instruction to execute one or more predetermined operations.

Figure 10:
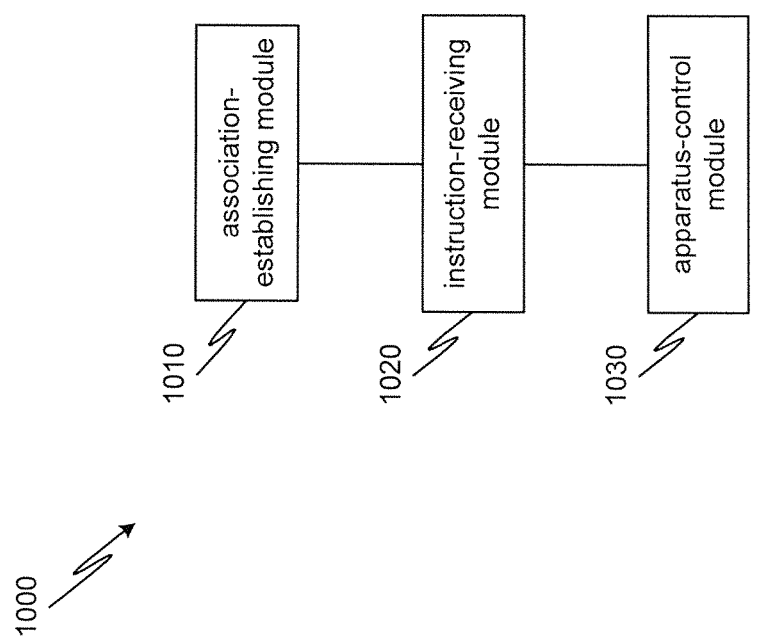
FIG. 10 is a simplified diagram showing an apparatus client for instant messaging according to one embodiment of the present invention.

FIG. 10 is a simplified diagram showing an apparatus client for instant messaging according to one embodiment of the present invention. The diagram is merely an example, which should not unduly limit the scope of the claims. One of ordinary skill in the art would recognize many variations, alternatives, and modifications. The apparatus client 1000 includes: an association-establishing module 1010, an instruction-receiving module 1020 and an apparatus-control module 1030.

According to one embodiment, the apparatus client 1000 corresponds to an entire component for instant messaging or part of a component for instant messaging through software, hardware or a combination of software and hardware. For example, the component for instant messaging may be connected with a traditional apparatus through a predetermined interface to become an intelligent apparatus. In another example, the component for instant messaging may be integrated into a circuit board or a chip, etc. to become a part of the intelligent apparatus. In yet another example, the association-establishing module 1010 is configured to establish the association relationship with at least one user client in the instant messaging. In yet another example, the instruction-receiving module 1020 is configured to receive a control instruction which has been transmitted by the user client which has the association relationship. In yet another example, the apparatus-control module 1030 is configured to control the intelligent apparatus, which is connected with the apparatus client, according to the control instruction to execute one or more predetermined operations.

Figure 11:
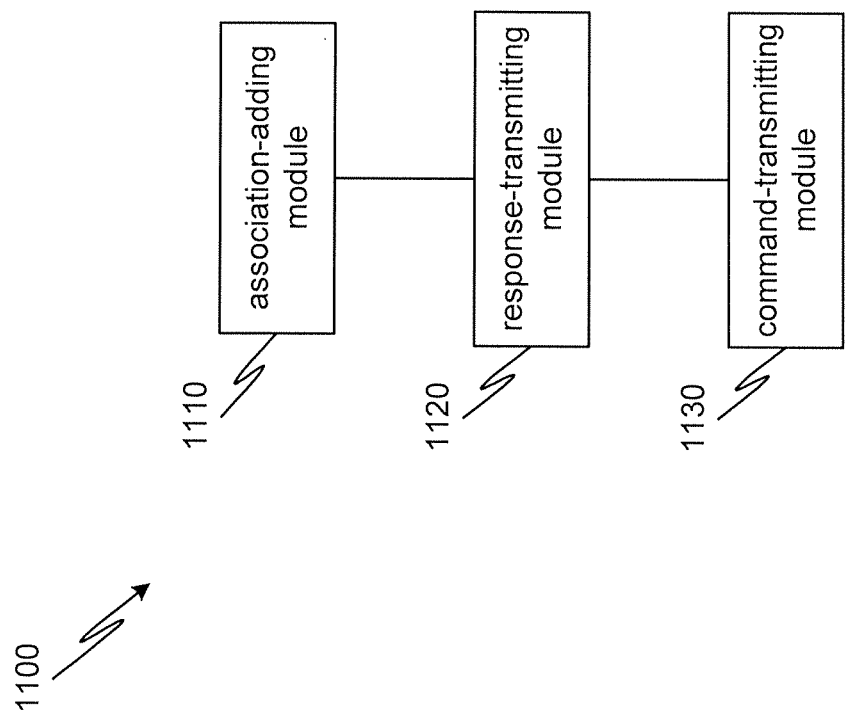
FIG. 11 is a simplified diagram showing an apparatus for instant messaging according to one embodiment of the present invention.

FIG. 11 is a simplified diagram showing an apparatus for instant messaging according to one embodiment of the present invention. The diagram is merely an example, which should not unduly limit the scope of the claims. One of ordinary skill in the art would recognize many variations, alternatives, and modifications. The apparatus 1100 includes: an association-adding module 1110, a response-transmitting module 1120 and a command-transmitting module 1130.

According to one embodiment, the association-adding module 1110 is configured to receive a request, which has been transmitted by a user client and corresponds to one apparatus client, for an addition of an association relationship. For example, the response-transmitting module 1120 is configured to transmit a successful-addition response to the user client, wherein the successful-addition response is configured to trigger the user client to establish the association relationship with the apparatus client. In another example, the command-transmitting module 1130 is configured to transmit a command for the addition of the association relationship to the apparatus client, wherein the command for the addition of the association relationship is configured to trigger the apparatus client to establish the association relationship with the user client.

Figure 12:
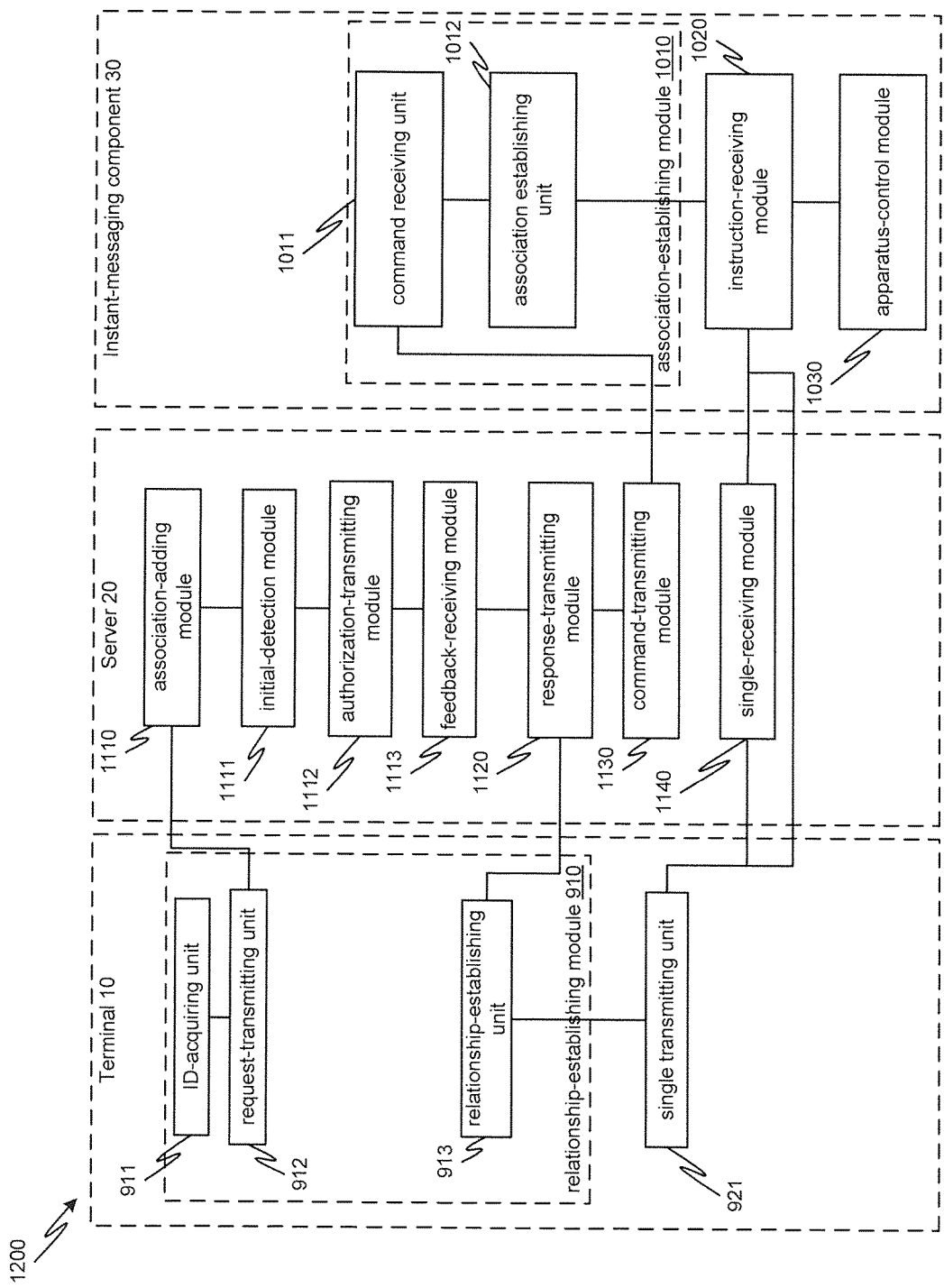
FIG. 12 is a simplified diagram showing a system for instant messaging according to one embodiment of the present invention.

FIG. 12 is a simplified diagram showing a system for instant messaging according to one embodiment of the present invention. The diagram is merely an example, which should not unduly limit the scope of the claims. One of ordinary skill in the art would recognize many variations, alternatives, and modifications. The system 1200 includes: a terminal 10, a server 20 and a component for instant messaging 30. For example, the terminal 10, the server 20 and the component for instant messaging 30 are connected through a wired network or a wireless network.

According to one embodiment, the terminal 10 includes a user client. For example, the user client corresponds to the entire terminal 10 or part of the terminal 10 through software, hardware or a combination of software and hardware. In another example, the user client includes: a relationship-establishing module 910 and an instruction-transmitting module 920. In yet another example, the relationship-establishing module 910 is configured to establish an association relationship with at last one apparatus client for instant messaging. In yet another example, the relationship-establishing module 910 includes: an ID-acquiring unit 911, a request-transmitting unit 912 and a relationship-establishing unit 913. In yet another example, the ID-acquiring unit 911 is configured to acquire an ID of the apparatus client through a predetermined mode, and the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology. In yet another example, the request-transmitting unit 912 is configured to transmit a request, which carries the ID of the apparatus client, for an addition of the association relationship to a server. In yet another example, the relationship-establishing unit 913 is configured to establish the association relationship with the apparatus client after having received a successful-addition response which has been fed back by the server.

Figure 13:
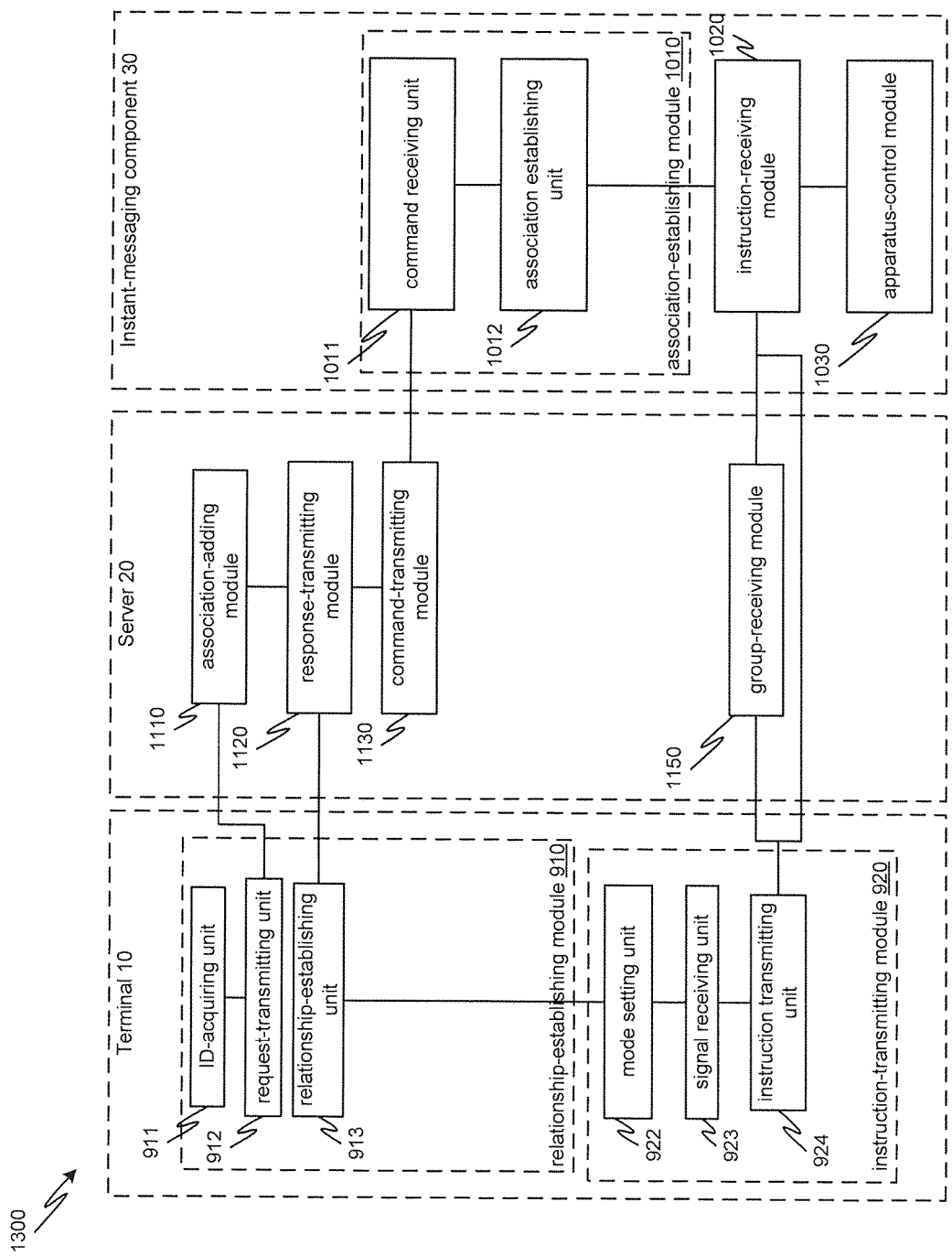
FIG. 13 is a simplified diagram showing a system for instant messaging according to another embodiment of the present invention.

According to another embodiment, the instruction-transmitting module 920 is configured to transmit a control instruction to the apparatus client which has the association relationship, and the control instruction is configured to trigger the apparatus client to control an intelligent apparatus, which is connected with the apparatus client, according to the control instruction to execute one or more predetermined operations. For example, the instruction-transmitting module 920 includes: a single transmitting unit 921. In another example, the instruction-transmitting module 920 includes a mode setting unit 922, a signal receiving unit 923 and an instruction transmitting unit 924 (e.g., as shown in FIG. 13). In yet another example, the single transmitting unit 921 is configured to transmit the control instruction with a single apparatus client as an object. In yet another example, the control instruction can be transmitted in different manners. Correspondingly, the single transmitting unit 921 includes: a first transmitting subunit, a second transmitting subunit, a third transmitting subunit, a fourth transmitting subunit, a fifth transmitting subunit, or a sixth transmitting subunit, in certain embodiments.

According to yet another embodiment, the first transmitting subunit is configured to transmit the control instruction directly or indirectly through the server to the apparatus client, which has the association relationship, at the time of receiving the control instruction which has been input in the form of button. For example, the second transmitting subunit is configured to transmit the control instruction directly or indirectly through the server to the apparatus client, which has the association relationship, at the time of receiving the control instruction which has been input in the form of button. In another example, the third transmitting subunit is configured to transmit the control instruction directly or indirectly through the server to the apparatus client, which has the association relationship, at the time of receiving the control instruction which has been input in the form of text which conforms to the fixed format. In yet another example, the fourth transmitting subunit is configured to transmit control information in the form of text at the time of receiving the control information which has been input in the form of the text which is in the non-fixed format, wherein the server transmits the control instruction to the apparatus client, which has the association relationship, after having analyzed the control information to acquire the corresponding control instruction. In yet another example, the fifth transmitting subunit is configured to analyze control information to acquire the corresponding control instruction at the time of receiving the control information which has been input in the form of voice, and transmitting the control instruction directly or indirectly through the server to the apparatus client which has the association relationship. In yet another example, the sixth transmitting subunit is configured to transmit control information in the form of voice at the time of receiving the control information which has been input in the form of the voice, where the server transmits the control instruction to the apparatus client, which has the association relationship, after having analyzed the control information by means of voice recognition to acquire the corresponding control instruction.

In one embodiment, the user client that establishes the association relationship with the apparatus client for the first time further includes: a request-receiving module, a signal-receiving module and a permission-feedback module. For example, the request-receiving module configured to receive an authorization request transmitted by the server, wherein the authorization request has been transmitted by the server to the first user client which establishes the association relationship with the apparatus client after the server has received the request, which carries the ID of the apparatus client and has been transmitted by other user clients, for the addition of the association relationship. In another example, the signal-receiving module configured to receive an input signal of whether the authorization request is permitted or not. In yet another example, the permission-feedback module configured to transmit permission feedback to the server if the input signal indicates the permission of the authorization request so that the server transmits the successful-addition response to the other user clients after having received the permission feedback.

In another embodiment, the server 20 includes an apparatus for instant messaging which corresponds to the entire server 20 or part of the server 20 through software, hardware or a combination of software and hardware. For example, the apparatus for instant messaging includes: an association-adding module 1110, an initial-detection module 1111, an authorization-transmitting module 1112, a feedback-receiving module 1113, a response-transmitting module 1120, a command-transmitting module 1130 and a single-receiving module 1140. For example, the association-adding module 1110 is configured to receive a request, which has been transmitted by the user client and corresponds to one apparatus client, for the addition of the association relationship.

In another example, the association-adding module 1110 is further configured to receive the request, which has been transmitted by the user client, for the addition of the association relationship. In yet another example, the request for the addition of the association relationship carries the ID of the apparatus client, and the ID of the apparatus client has been acquired by the user client through a predetermined mode. In yet another example, the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology.

In another embodiment, the initial-detection module 1111 is configured to detect whether the user client that establishes the association relationship with the apparatus client for the first time exists or not. For example, the authorization-transmitting module 1112 is configured to transmit the authorization request to the user client, which establishes the association relationship with the apparatus client for the first time, if the detection result shows that the user client exists. In another example, the feedback-receiving module 1113 is configured to execute the process of transmitting the successful-addition response to the user client at the time of receiving the permission feedback which has been transmitted by the user client which establishes the association relationship with the apparatus client for the first time. In yet another example, the response-transmitting module 1120 is configured to transmit the successful-addition response to the user client, and the successful-addition response is configured to trigger the user client to establish the association relationship with the apparatus client. In yet another example, the command-transmitting module 1130 is configured to transmit a command for the addition of the association relationship to the apparatus client, and the command for the addition of the association relationship is configured to trigger the apparatus client to establish the association relationship with the user client. In yet another example, the single-receiving module 1140 is configured to receive the control instruction, which has been transmitted by the user client with the single apparatus client as the object, and to forward the control instruction to the apparatus client.

In yet another embodiment, the single-receiving module 1140 includes: an instruction receiving unit, a text receiving unit, or a voice receiving unit. For example, the instruction receiving unit is configured to receive the control instruction, which has been transmitted by the user client, and to forward the control instruction to the apparatus client. As an example, the control instruction has been transmitted when the user client has received the control instruction which has been input in the form of a button. As another example, the control instruction has been transmitted when the user client has received the control instruction which has been input in the form of a text which conforms to the fixed format. As yet another example, the control instruction has been transmitted after the user client receives the control information, which has been input in the form of a text which is in the non-fixed format, and analyzes the control information to acquire the corresponding control instruction. As yet another example, the control instruction has been transmitted after the user client receives the control information, which has been input in the form of voice data, and analyzes the control information by means of voice recognition to acquire the corresponding control instruction. As yet another example, the text receiving unit is configured to receive the control information which has been transmitted by the user client and input in the form of a text which is in the non-fixed format, to analyze the control information to acquire the corresponding control instruction and to forward the control instruction to the apparatus client. As yet another example, the voice receiving unit is configured to receive the control information which has been transmitted by the user client and input in the form of voice, to analyze the control information by means of voice recognition so as to acquire the corresponding control instruction and to forward the control instruction to the apparatus client.

In yet another embodiment, the component for instant messaging 30 may be an integrated circuit or a chip. For example, the component for instant messaging 30 includes an apparatus client, and the apparatus client corresponds to the entire component 30 or part of the component for instant messaging 30 through software, hardware or a combination of software and hardware. In another example, the apparatus client includes: the association-establishing module 1010, the instruction-receiving module 1020 and the apparatus-control module 1030. In yet another example, the association-establishing module 1010 is configured to establish the association relationship with at least one user client in the instant messaging. In yet another example, the association-establishing module 1010 includes: a command receiving unit 1011 and an association establishing unit 1012. In yet another example, the command receiving unit 1011 is configured to receive the command, which carries the ID of the user client and has been transmitted by a server, for the addition of the association relationship. In yet another example, the command for the addition of the association relationship has been transmitted after the server has received the request, which has been transmitted by the user client, for the addition of the association relationship. In yet another example, the association establishing unit 1012 is configured to establish the association relationship with the user client. In yet another example, the instruction-receiving module 1020 is configured to receive the control instruction which has been transmitted by the user client which has the association relationship.

According to one embodiment, the instruction-receiving module 1020 includes: a direct receiving unit; or an indirect receiving unit. For example, the direct receiving unit is configured to receive the control instruction which has been directly transmitted by the user client. In another example, the control instruction has been transmitted when the user client has received the control instruction which has been input in the form of a button. In yet another example, the control instruction has been transmitted after the user client has received the control instruction which has been input in the form of a text which conforms to the fixed format. In yet another example, the control instruction has been transmitted after the user client has received control information, which has been input in the form of a text which is in the non-fixed format, and analyzed the control information to acquire a corresponding control instruction. In yet another example, the control instruction has been transmitted after the user client has received control information, which has been input in the form of voice data, and analyzed the control information by means of voice recognition to acquire the corresponding control instruction.

According to another embodiment, the indirect receiving unit is configured to receive the control instruction which has been indirectly forwarded by the user client through the server. For example, the control instruction has been forwarded after the server has received the control instruction which has been transmitted by the user client. In another example, the control instruction has been forwarded after the server has received control information, which has been input in the form of a text which is in the non-fixed format, and analyzed the control information, which has been transmitted by the user client, to acquire the corresponding control instruction. In yet another example, the control instruction has been forwarded after the server has received control information, which has been transmitted by the user client and input in the form of voice, and analyzed the control information by means of voice recognition to acquire the corresponding control instruction. In yet another example, the apparatus-control module 1030 is configured to control the intelligent apparatus, which is connected with the apparatus client, according to the control instruction to execute one or more predetermined operations.

FIG. 13 is a simplified diagram showing a system for instant messaging according to another embodiment of the present invention. The diagram is merely an example, which should not unduly limit the scope of the claims. One of ordinary skill in the art would recognize many variations, alternatives, and modifications. The system 1300 includes: the terminal 10, the server 20 and the component for instant messaging 30. For example, the terminal 10, the server 20 and the component for instant messaging 30 are connected through a wired network or a wireless network.

According to one embodiment, the terminal 10 includes a user client which corresponds to the entire terminal 10 or part of the terminal 10 through software, hardware or a combination of software and hardware. For example, the user client includes: a relationship-establishing module 910 and an instruction-transmitting module 920. As an example, the relationship-establishing module 910 is configured to establish an association relationship with at last one apparatus client in instant messaging. For example, the relationship-establishing module 910 includes: an ID-acquiring unit 911, a request-transmitting unit 912 and a relationship-establishing unit 913. In another example, the ID-acquiring unit 911 is configured to acquire an ID of the apparatus client through a predetermined mode, and the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology. In yet another example, the request-transmitting unit 912 is configured to transmit a request, which carries the ID of the apparatus client, for an addition of the association relationship to a server. In yet another example, the relationship-establishing unit 913 is configured to establish the association relationship with the apparatus client after having received a successful-addition response which has been fed back by the server. In yet another example, the instruction-transmitting module 920 is configured to transmit a control instruction to the apparatus client with has the association relationship, and the control instruction is configured to trigger the apparatus client to control an intelligent apparatus, which is connected with the apparatus client, according to the control instruction to execute one or more predetermined operations.

According to another embodiment, the instruction-transmitting module 920 includes: the single transmitting unit 921. For example, the instruction-transmitting module 920 includes: the mode setting unit 922, the signal receiving unit 923 and the instruction transmitting unit 924. In another example, the mode setting unit 922 is configured to set at least one control mode with a group, which includes at least two apparatus clients, as an object, wherein each control mode includes the control instructions which respectively correspond to each apparatus client in the group. In yet another example, the signal receiving unit 923 is configured to receive a control signal which triggers or switches the control mode. In yet another example, the instruction transmitting unit 924 is configured to transmit a corresponding control instruction directly or forwarding the corresponding control instruction indirectly through the server to each apparatus client in the group according to the control mode on which the control signal acts. In yet another example, the server 20 includes an apparatus for instant messaging which corresponds to the entre server 20 or part of the server 20 through software, hardware or a combination of software and hardware. In yet another example, the apparatus for instant messaging includes: the association-adding module 1110, the response-transmitting module 1120, the command-transmitting module 1130 and a group-receiving module 1150.

According to yet another embodiment, the association-adding module 1110 is configured to receive a request, which has been transmitted by the user client and corresponds to one apparatus client, for the addition of the association relationship. For example, the association-adding module 1110 is further configured to receive the request, which has been transmitted by the user client, for the addition of the association relationship. In another example, the request for the addition of the association relationship carries the ID of the apparatus client, the ID of the apparatus client has been acquired by the user client through a predetermined mode, and the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology. In yet another example, the response-transmitting module 1120 is configured to transmit a successful-addition response to the user client, and the successful-addition response is configured to trigger the user client to establish the association relationship with the apparatus client. In yet another example, the command-transmitting module 1130 is configured to transmit a command for the addition of the association relationship to the apparatus client, and the command for the addition of the association relationship is configured to trigger the apparatus client to establish the association relationship with the user client. In yet another example, the group-receiving module 1150 is configured to receive the corresponding control instruction, which has been transmitted by the user client to each apparatus client in a group according to the control mode on which the control signal acts, and to forward the control instruction, to which each apparatus client corresponds, respectively to each apparatus client in the group. In yet another example, the control mode is set by the user client with the group, which includes at least two apparatus clients, as an object, and each control mode includes the control instructions which respectively correspond to each apparatus client in the group. In yet another example, the control signal is received by the user client and triggers or switches the control mode. In yet another example, the component for instant messaging 30 may be an integrated circuit or a chip. In yet another example, the component for instant messaging 30 includes the apparatus client which corresponds to the entire component 30 or part of the component for instant messaging 30 through software, hardware or a combination of software and hardware. In yet another example, the apparatus client includes: the association-establishing module 1010, the instruction-receiving module 1020 and the apparatus-control module 1030.

In one embodiment, the association-establishing module 1010 is configured to establish the association relationship with at least one user client in the instant messaging. For example, the association-establishing module 1010 includes: a command receiving unit 1011 and an association establishing unit 1012. In another example, the command receiving unit 1011 is configured to receive the command, which carries the ID of the user client and has been transmitted by a server, for the addition of the association relationship. In another example, the command for the addition of the association relationship has been transmitted after the server has received the request, which has been transmitted by the user client, for the addition of the association relationship. In yet another example, the association establishing unit 1012 is configured to establish the association relationship with the user client. In yet another example, the instruction-receiving module 1020 is configured to receive the control instruction which has been transmitted by the user client which has the association relationship. In yet another example, the instruction-receiving module 1020 includes: a direct receiving unit; or an indirect receiving unit.

In another embodiment, the direct receiving unit is configured to receive the control instruction which has been directly transmitted by the user client. For example, the control instruction has been transmitted when the user client has received the control instruction which has been input in the form of button. In another example, the control instruction has been transmitted after the user client has received the control instruction which has been input in the form of text which conforms to the fixed format. In yet another example, the control instruction has been transmitted after the user client has received control information, which has been input in the form of a text which is in the non-fixed format, and analyzed the control information to acquire a corresponding control instruction. In yet another example, the control instruction has been transmitted after the user client has received control information, which has been input in the form of voice data, and analyzed the control information by means of voice recognition to acquire the corresponding control instruction.

In yet another embodiment, the indirect receiving unit is configured to receive the control instruction which has been indirectly forwarded by the user client through the server. For example, the control instruction has been forwarded after the server has received the control instruction which has been transmitted by the user client. In another example, the control instruction has been forwarded after the server has received control information, which has been input in the form of a text which is in the non-fixed format, and analyzed the control information, which has been transmitted by the user client, to acquire the corresponding control instruction. In yet another example, the control instruction has been forwarded after the server has received control information, which has been transmitted by the user client and input in the form of voice data, and analyzed the control information by means of voice recognition to acquire the corresponding control instruction. In yet another example, the apparatus-control module 1030 is configured to control the intelligent apparatus, which is connected with the apparatus client, according to the control instruction to execute one or more predetermined operations.

Figure 14:
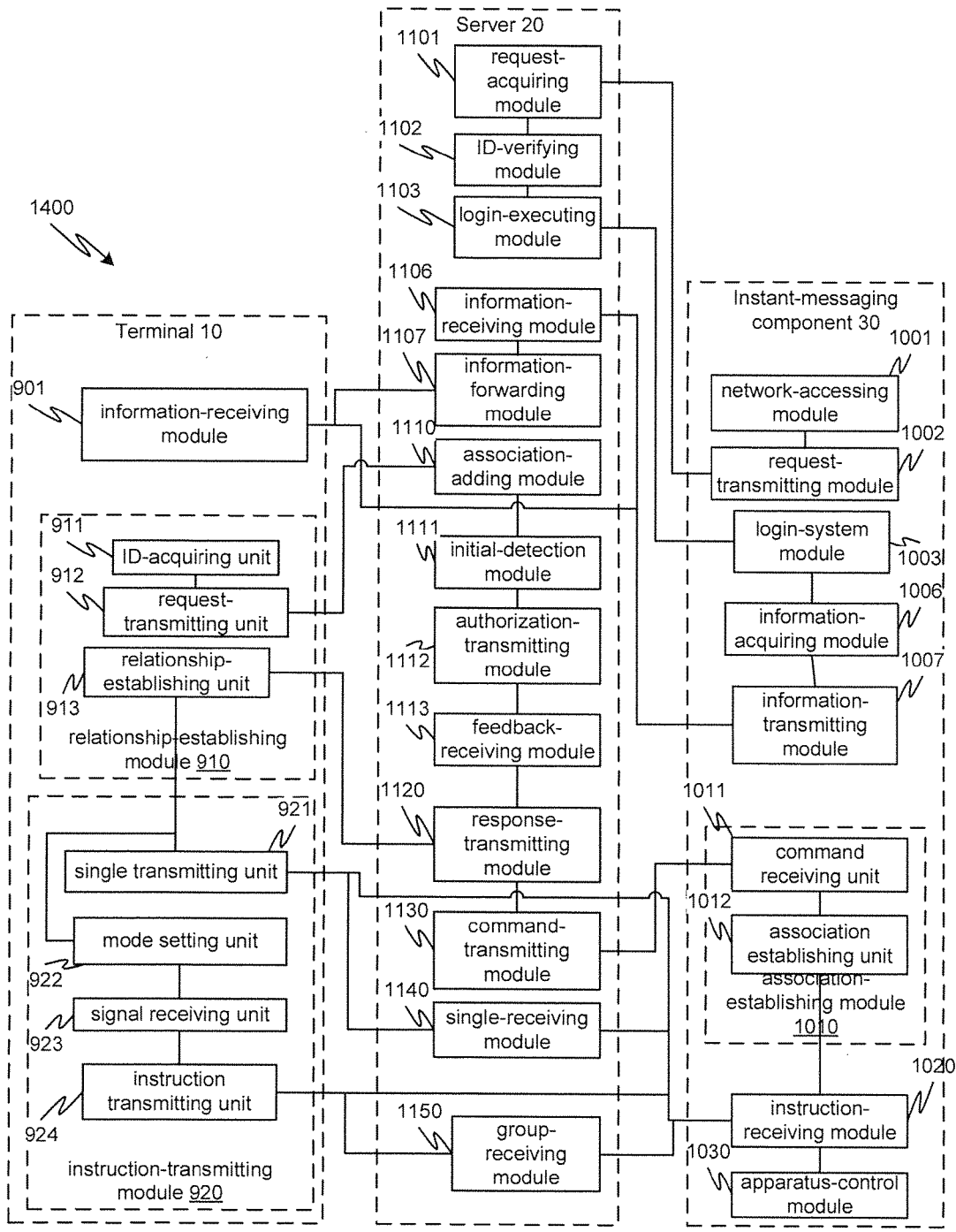
FIG. 14 is a simplified diagram showing a system for instant messaging according to yet another embodiment of the present invention.

FIG. 14 is a simplified diagram showing a system for instant messaging according to yet another embodiment of the present invention. The diagram is merely an example, which should not unduly limit the scope of the claims. One of ordinary skill in the art would recognize many variations, alternatives, and modifications. The system 1400 includes: the terminal 10, the server 20 and the component for instant messaging 30. For example, the terminal 10, the server 20 and the component for instant messaging 30 are connected through a wired network or a wireless network.

According to one embodiment, the terminal 10 includes a user client which corresponds to the entire terminal 10 or part of the terminal 10 through software, hardware or a combination of software and hardware. For example, the user client includes: an information-receiving module 901, the relationship-establishing module 910 and the instruction-transmitting module 920. As an example, the information-receiving module 901 is configured to receive apparatus information which has been directly transmitted or indirectly forwarded by the apparatus client, which has the association relationship, through the server, where the apparatus information includes attribute information and/or status information acquired by the apparatus client from the intelligent apparatus which is connected with the apparatus client. In another example, the relationship-establishing module 910 is configured to establish an association relationship with at last one apparatus client in instant messaging. In yet another example, the relationship-establishing module 910 includes: the ID-acquiring unit 911, the request-transmitting unit 912 and the relationship-establishing unit 913.

According to another embodiment, the ID-acquiring unit 911 is configured to acquire an ID of the apparatus client through a predetermined mode, and the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology. For example, the request-transmitting unit 912 is configured to transmit a request, which carries the ID of the apparatus client, for an addition of the association relationship to a server. In another example, the relationship-establishing unit 913 is configured to establish the association relationship with the apparatus client after having received a successful-addition response which has been fed back by the server. In yet another example, the instruction-transmitting module 920 is configured to transmit a control instruction to the apparatus client which has the association relationship, and the control instruction is configured to trigger the apparatus client to control an intelligent apparatus, which is connected with the apparatus client, according to the control instruction to execute one or more predetermined operations. In yet another example, the instruction-transmitting module 920 includes: the single transmitting unit 921; or the mode setting unit 922, the signal receiving unit 923 and the instruction transmitting unit 924.

According to yet another embodiment, the single transmitting unit 921 is configured to transmit the control instruction with a single apparatus client as an object. For example, the mode setting unit 922 is configured to set at least one control mode with a group, which includes at least two apparatus clients, as an object, wherein each control mode includes the control instructions which respectively correspond to each apparatus client in the group. In another example, the signal receiving unit 923 is configured to receive a control signal which triggers or switches the control mode. In yet another example, the instruction transmitting unit 924 is configured to transmit a corresponding control instruction directly or forwarding the corresponding control instruction indirectly through the server to each apparatus client in the group according to the control mode on which the control signal acts. In yet another example, the server 20 includes an apparatus for instant messaging which corresponds to the entire server 20 or part of the server 20 through software, hardware or a combination of software and hardware. In yet another example, the apparatus for instant messaging includes: a request-acquiring module 1101, an ID-verifying module 1102, a login-executing module 1103, an information-receiving module 1106, an information-forwarding module 1107, the association-adding module 1110, the response-transmitting module 1120, the command-transmitting module 1130, the single-receiving module 1140 and the group-receiving module 1150.

In one embodiment, the request-acquiring module 1101 is configured to receive a login request which carries the ID of the apparatus client and has been transmitted by the apparatus client through a predetermined network, and the predetermined network is a network which the apparatus client has accessed, and the predetermined network includes at least one of WIFI, 3GPP, 4G network, WLAN and wired network. For example, the ID-verifying module 1102 is configured to verify whether the ID of the apparatus client is a pre-registered ID or not. In another example, the login-executing module 1103 is configured to make the apparatus client log in to an online status in the instant messaging if the verification result shows that the ID of the apparatus client is the pre-registered ID. In yet another example, the information-receiving module 1106 is configured to receive the apparatus information which has been transmitted by the apparatus client, wherein the apparatus information includes attribute information and/or status information acquired by the apparatus client from the intelligent apparatus which is connected with the apparatus client. In yet another example, the information-forwarding module 1107 is configured to forward the apparatus information to the user client which has the association relationship with the apparatus client.

In another embodiment, the association-adding module 1110 is configured to receive a request, which has been transmitted by the user client and corresponds to one apparatus client, for the addition of the association relationship. For example, the association-adding module 1110 is further configured to receive the request, which has been transmitted by the user client, for the addition of the association relationship. In another example, the request for the addition of the association relationship carries the ID of the apparatus client, the ID of the apparatus client has been acquired by the user client through a predetermined mode, and the predetermined mode includes any one of the following: scanning a two-dimensional code on the apparatus client, scanning a barcode on the apparatus client, receiving input text information, identifying text on the apparatus client, and/or communicating with the apparatus client by means of a near field communication (NFC) technology. In yet another example, the response-transmitting module 1120 is configured to transmit a successful-addition response to the user client, and the successful-addition response is configured to trigger the user client to establish the association relationship with the apparatus client. In yet another example, the command-transmitting module 1130 is configured to transmit a command for the addition of the association relationship to the apparatus client, and the command for the addition of the association relationship is configured to trigger the apparatus client to establish the association relationship with the user client. In yet another example, the single-receiving module 1140 is configured to receive the control instruction, which has been transmitted by the user client with the single apparatus client the an object, and to forward the control instruction to the apparatus client.

In yet another embodiment, the single-receiving module 1140 includes: the instruction receiving unit; the text receiving unit; or the voice receiving unit. For example, the instruction receiving unit is configured to receive the control instruction, which has been transmitted by the user client, and to forward the control instruction to the apparatus client. In another example, the control instruction has been transmitted when the user client has received the control instruction which has been input in the form of a button. In another example, the control instruction has been transmitted when the user client has received the control instruction which has been input in the form of a text which conforms to the fixed format. In yet another example, the control instruction has been transmitted after the user client has received control information, which has been input in the form of a text which is in the non-fixed format, and analyzed the control information to acquire the corresponding control instruction. In yet another example, the control instruction has been transmitted after the user client has received control information, which has been input in the form of voice, and analyzed the control information by means of voice recognition to acquire the corresponding control instruction.

In yet another embodiment, the text receiving unit is configured to receive control information which has been transmitted by the user client and input in the form of text which is in the non-fixed format, to analyze the control information to acquire the corresponding control instruction and to forward the control instruction to the apparatus client. For example, the voice receiving unit is configured to receive control information which has been transmitted by the user client and input in the form of voice, to analyze the control information by means of voice recognition so as to acquire the corresponding control instruction and to forward the control instruction to the apparatus client. In yet another example, the group-receiving module 1150 is configured to receive the corresponding control instruction, which has been transmitted by the user client to each apparatus client in a group according to the control mode on which the control signal acts, and to forward the control instruction, to which each apparatus client corresponds, respectively to each apparatus client in the group. In yet another example, the control mode is set by the user client with the group, which includes at least two apparatus clients, as an object. In yet another example, each control mode includes the control instructions which respectively correspond to each apparatus client in the group, and the control signal is a control signal which has been received by the user client and triggers or switches the control mode.

In yet another embodiment, the component for instant messaging 30 may be an integrated circuit or a chip, and the component for instant messaging 30 includes the apparatus client that corresponds to the entire component 30 or part of the component for instant messaging 30 through software, hardware or a combination of software and hardware. For example, the apparatus client includes: a network-accessing module 1001, a request-transmitting module 1002, a login-system module 1003, an information-acquiring module 1006, an information-transmitting module 1007, the association-establishing module 1010, the instruction-receiving module 1020 and the apparatus-control module 1030. In another example, the network-accessing module 1001 is configured to access a predetermined network, and the predetermined network includes at least one of WIFI, 3GPP, 4G network, WLAN and wired network. In yet another example, the request-transmitting module 1002 is configured to transmit the login request, which carries the ID of the apparatus client, to the server through the predetermined network. In yet another example, the login-system module 1003 is configured to log in to the online status in the instant messaging when the server has verified that the ID is a pre-registered ID. In yet another example, the information-acquiring module 1006 is configured to acquire the attribute information and/or the status information of the intelligent apparatus from the intelligent apparatus which is connected with the apparatus client. In yet another example, the information-transmitting module 1007 is configured to transmit the apparatus information directly or forwarding the apparatus information indirectly through the server to the user client which has the association relationship, wherein the apparatus information includes the attribute information and/or the status information of the intelligent apparatus. In yet another example, the association-establishing module 1010 is configured to establish the association relationship with at least one user client in the instant messaging. In yet another example, the association-establishing module 1010 includes: the command receiving unit 1011 and the association establishing unit 1012.

According to one embodiment, the command receiving unit 1011 is configured to receive the command, which carries the ID of the user client and has been transmitted by the server, for the addition of the association relationship, and the command for the addition of the association relationship has been transmitted after the server has received the request, which has been transmitted by the user client, for the addition of the association relationship. For example, the association establishing unit 1012 is configured to establish the association relationship with the user client. In another example, the instruction-receiving module 1020 is configured to receive the control instruction which has been transmitted by the user client which has the association relationship. In yet another example, the instruction-receiving module 1020 includes: the direct receiving unit; or the indirect receiving unit.

According to another embodiment, the direct receiving unit is configured to receive the control instruction which has been directly transmitted by the user client. For example, the control instruction has been transmitted when the user client has received the control instruction which has been input in the form of a button. In another example, the control instruction has been transmitted when the user client has received the control instruction which has been input in the form of a text which conforms to the fixed format. In yet another example, the control instruction has been transmitted after the user client has received control information, which has been input in the form of a text which is in the non-fixed format, and analyzed the control information to acquire the corresponding control instruction. In yet another example, the control instruction has been transmitted after the user client has received control information, which has been input in the form of voice data, and analyzed the control information by means of voice recognition to acquire the corresponding control instruction.

According to yet another embodiment, the indirect receiving unit is configured to receive the control instruction which has been indirectly forwarded by the user client through the server. For example, the control instruction has been forwarded after the server has received the control instruction which has been transmitted by the user client. In another example, the control instruction has been forwarded after the server has received control information, which has been input in the form of a text which is in the non-fixed format, and analyzed the control information, which has been transmitted by the user client, to acquire the corresponding control instruction. In yet another example, the control instruction has been forwarded after the server has received control information, which has been transmitted by the user client and input in the form of voice data, and analyzed the control information by means of voice recognition to acquire the corresponding control instruction. In yet another example, the apparatus-control module 1030 is configured to control the intelligent apparatus, which is connected with the apparatus client, according to the control instruction to execute one or more predetermined operations.

According to another embodiment, a method is provided for instant messaging. For example, a first association relationship with at least one first apparatus client for instant messaging is established; and a first control instruction is transmitted to the at least one first apparatus client to trigger the at least one first apparatus client to control, according to the first control instruction, an intelligent apparatus connected to the at least one first apparatus client to execute one or more predetermined operations. For example, the storage medium is implemented according to at least FIG. 2.

According to another embodiment, a method is provided for instant messaging. For example, an association relationship with at least one user client for instant messaging is established; a control instruction transmitted by the at least one user client is received; and an intelligent apparatus connected with the at least one user client is controlled according to the control instruction to execute one or more predetermined operations. For example, the storage medium is implemented according to at least FIG. 4.

According to yet another embodiment, a method is provided for instant messaging. For example, a first addition request for adding a first association relationship corresponding to at least one first apparatus client is received from a first user client; a first successful-addition response is transmitted to the first user client, the first successful-addition response being used to trigger the first user client to establish the first association relationship with the at least one first apparatus client; and an addition command for adding the first association relationship is transmitted to the at least one first apparatus client, the addition command for adding the first association relationship being used to trigger the at least one first apparatus client to establish the first association relationship with the first user client. For example, the storage medium is implemented according to at least FIG. 5.

In one embodiment, a user client includes: a relationship-establishing module configured to establish a first association relationship with at least one first apparatus client for instant messaging; and an instruction-transmitting module configured to transmit a first control instruction to the at least one first apparatus client to trigger the apparatus client to control, according to the first control instruction, an intelligent apparatus connected to the apparatus client to execute one or more predetermined operations. For example, the user client is implemented according to at least FIG. 9.

In another embodiment, an apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations. For example, the apparatus client is implemented according to at least FIG. 10.

In yet another embodiment, an apparatus for instant messaging includes: an association-adding module configured to receive a first addition request for adding a first association relationship corresponding to at least one first apparatus client from a first user client; a response-transmitting module configured to transmit a first successful-addition response to the first user client, the first successful-addition response being used to trigger the first user client to establish the first association relationship with the at least one first apparatus client; and a command-transmitting module configured to transmit an addition command for adding the first association relationship to the at least one first apparatus client, the addition command for adding the first association relationship being used to trigger the at least one first apparatus client to establish the first association relationship with the first user client. For example, the apparatus is implemented according to at least FIG. 11.

According to one embodiment, a component for instant messaging includes: an apparatus client. The apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations. For example, the component is implemented according to at least FIG. 12, FIG. 13, and/or FIG. 14.

According to another embodiment, an intelligent apparatus includes: a component for instant messaging including an apparatus client. The apparatus client includes: an association-establishing module configured to establish an association relationship with at least one user client for instant messaging; an instruction-receiving module configured to receive a control instruction transmitted by the at least one user client; and an apparatus-control module configured to control an intelligent apparatus connected with the at least one user client according to the control instruction to execute one or more predetermined operations. For example, the intelligent apparatus is implemented according to at least FIG. 12, FIG. 13, and/or FIG. 14.

According to yet another embodiment, a system for instant messaging includes: a terminal; a server; and a first intelligent apparatus. The terminal includes a user client. The user client includes: a relationship-establishing module configured to establish a first association relationship with at least one first apparatus client for instant messaging; and an instruction-transmitting module configured to transmit a first control instruction to the at least one first apparatus client to trigger the at least one first apparatus client to control, according to the first control instruction, a second intelligent apparatus connected to the at least one first apparatus client to execute one or more predetermined operations. The server includes an apparatus for instant messaging. The apparatus for instant messaging includes: an association-adding module configured to receive a first addition request for adding the first association relationship corresponding to the at least one first apparatus client from a first user client; a response-transmitting module configured to transmit a first successful-addition response to the first user client, the first successful-addition response being used to trigger the first user client to establish the first association relationship with the at least one first apparatus client; and a command-transmitting module configured to transmit an addition command for adding the first association relationship to the at least one first apparatus client, the addition command for adding the first association relationship being used to trigger the at least one first apparatus client to establish the first association relationship with the first user client. The first intelligent apparatus includes a component for instant messaging including a second apparatus client. The second apparatus client includes: an association-establishing module configured to establish a second association relationship with at least one second user client for instant messaging; an instruction-receiving module configured to receive a second control instruction transmitted by the at least one second user client; and an apparatus-control module configured to control a third intelligent apparatus connected with the at least one second user client according to the second control instruction to execute one or more predetermined operations. For example, the system is implemented according to at least FIG. 12, FIG. 13, and/or FIG. 14.

In one embodiment, a non-transitory computer readable storage medium includes programming instructions for instant messaging. The programming instructions configured to cause one or more data processors to execute certain operations. For example, a first association relationship with at least one first apparatus client for instant messaging is established; and a first control instruction is transmitted to the at least one first apparatus client to trigger the at least one first apparatus client to control, according to the first control instruction, an intelligent apparatus connected to the at least one first apparatus client to execute one or more predetermined operations. For example, the storage medium is implemented according to at least FIG. 2.

In another embodiment, a non-transitory computer readable storage medium includes programming instructions for instant messaging. The programming instructions configured to cause one or more data processors to execute certain operations. For example, an association relationship with at least one user client for instant messaging is established; a control instruction transmitted by the at least one user client is received; and an intelligent apparatus connected with the at least one user client is controlled according to the control instruction to execute one or more predetermined operations. For example, the storage medium is implemented according to at least FIG. 4.

In yet another embodiment, a non-transitory computer readable storage medium includes programming instructions for instant messaging. The programming instructions configured to cause one or more data processors to execute certain operations. For example, a first addition request for adding a first association relationship corresponding to at least one first apparatus client is received from a first user client; a first successful-addition response is transmitted to the first user client, the first successful-addition response being used to trigger the first user client to establish the first association relationship with the at least one first apparatus client; and an addition command for adding the first association relationship is transmitted to the at least one first apparatus client, the addition command for adding the first association relationship being used to trigger the at least one first apparatus client to establish the first association relationship with the first user client. For example, the storage medium is implemented according to at least FIG. 5.

The above only describes several scenarios presented by the invention, and the description is relatively specific and detailed, yet it cannot therefore be understood as limiting the scope of the invention's patent. It should be noted that ordinary technicians in the field may also, without deviating from the invention's conceptual premises, make a number of variations and modifications, which are all within the scope of the invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While the specification contains many specifics, these should not be construed as limitations on the scope or of what may be claimed, but rather as descriptions of features specific to particular embodiments. Certain features that are described in the specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, they should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for instant messaging comprising:
   establishing, by a user client, a first association relationship with at least one first apparatus client for instant messaging through a predetermined network;
   transmitting, by the user client, a first control instruction to the at least one first apparatus client to trigger the at least one first apparatus client to control, according to the first control instruction, an intelligent apparatus connected to the at least one first apparatus client to execute one or more predetermined operations;
   receiving, by the user client, apparatus information of the intelligent apparatus;
   displaying a list of associated intelligent apparatuses in a graphical user interface of the user client, the list including the intelligent apparatus having the first association relationship with the at least one first apparatus client; and
   establishing at least two apparatus groups based on a group-creation user selection on the graphical user interface designating multiple listed intelligent apparatuses to be included in one of the at least two apparatus groups, the at least two apparatus groups including a monitoring apparatus group and a non-monitoring apparatus group, the monitoring apparatus group being associated with a first control mode, and the non-monitoring apparatus group being associated with a second control mode;
   wherein transmitting the first control instruction to the at least one first apparatus client comprises:
      in response to a first user instruction directed to the monitoring apparatus group and received on the graphical user interface, respectively transmitting, by the user client through the predetermined network, a first-type control instruction to each apparatus client corresponding to each intelligent apparatus in the monitoring apparatus group to trigger all intelligent apparatus in the monitoring apparatus group to perform a same first operation; and in response to a second user instruction directed to the non-monitoring apparatus group and received on the graphical user interface, respectively transmitting, by the user client through the predetermined network, a second-type control instruction to each apparatus client corresponding to each intelligent apparatus in the non-monitoring apparatus group to trigger all intelligent apparatus in the non-monitoring apparatus group to perform a same second operation, wherein:
the intelligent apparatus is associated with either the monitoring apparatus group or the non-monitoring apparatus group based on the received apparatus information; and
the first control mode of the monitoring apparatus group differs from the second control mode of the non-monitoring apparatus group; and wherein:
the first-type control instruction is a switch-on instruction and the same first operation is switching on the corresponding intelligent apparatus in the monitoring apparatus group; or the first-type control instruction is a switch-off instruction and the same first operation is switching off the corresponding intelligent apparatus in the monitoring apparatus group; and the method further comprises:
receiving a control mode selection on the graphical user interface, the control mode selection comprising both the first user instruction and the second user instruction, wherein one of the first-type control instruction and the second-type control instruction is the switch-on instruction, and the other one of the first-type control instruction and the second-type control instruction is the switch-off instruction; and
transmitting the first-type control instruction to each apparatus client corresponding to each intelligent apparatus in the monitoring apparatus group, at the same time as transmitting the second-type control instruction to each apparatus client corresponding to each intelligent apparatus in the non-monitoring apparatus group.

2. The method of claim 1, wherein the establishing a first association relationship with at least one first apparatus client for instant messaging includes:
acquiring an identification (ID) of at least one first apparatus client through a predetermined mode;
wherein the predetermined mode includes one selected from the group consisting of: scanning a two-dimensional code on the at least one first apparatus client, scanning a barcode on the at least one first apparatus client, receiving an input text, identifying a first text on the at least one first apparatus client, and communicating with the at least one first apparatus client through a near field communication (NFC) technology;
transmitting a first addition request for adding the first association relationship to a server, the first addition request including the ID of the at least one first apparatus client; and
establishing the first association relationship with the at least one first apparatus client in response to receiving a first successful-addition response from the server.

3. The method of claim 2, further comprising:
receiving an authorization request transmitted by the server;
wherein the authorization request is transmitted by the server to a first user client in a second association relationship with the at least one first apparatus client in response to the server receiving one or more second addition requests for adding one or more third association relationships from one or more second user clients, the second addition requests including the ID of the at least one first apparatus client;
receiving an input signal indicating whether the authorization request is permitted;
in response to the input signal indicating the authorization request is permitted, transmitting a permission feedback to the server so that the server transmits a second successful-addition response to the second user clients upon receiving the permission feedback.

4. The method of claim 1, wherein the transmitting a first control instruction to the at least one first apparatus client to trigger the at least one first apparatus client to control, according to the first control instruction, an intelligent apparatus connected to the at least one first apparatus client to execute one or more predetermined operations includes:
in response to the at least one first apparatus client including a single second apparatus client, transmitting the first control instruction with the second apparatus client as a first object;
in response to the at least one first apparatus client including a plurality of third apparatus clients,
setting at least one control mode with the third apparatus clients as a second object, wherein the at least one control mode includes a plurality of second control instructions corresponding to the third apparatus clients;
receiving a control signal which triggers or switches the at least one control mode; and
transmitting the second control instructions to the third apparatus clients directly or indirectly through a server based on at least information associated with the at least one control mode.

5. The method of claim 4, wherein the in response to the at least one first apparatus client including a single second apparatus client, transmitting the first control instruction with the second apparatus client as a first object includes:
in response to receiving the first control instruction input in a form of a button, transmitting the first control instruction to the second apparatus client directly or indirectly through the server;
in response to receiving the first control instruction input in a form of a first text in a fixed format, transmitting the first control instruction to the second apparatus client directly or indirectly through the server;
in response to receiving control information associated with the first control instruction input in a form of a second text in a non-fixed format,
analyzing the control information to obtain the first control instruction; and
transmitting the first control instruction to the second apparatus client directly or indirectly through the server; and
in response to receiving the control information associated with the first control instruction input in a form of voice data, analyzing the control information through voice recognition to obtain the first control instruction; and
transmitting the first control instruction to the second apparatus client directly or indirectly through the server.

6. The method of claim 4, wherein the in response to the at least one first apparatus client including a single second apparatus client, transmitting the first control instruction with the second apparatus client as a first object includes:
in response to receiving control information associated with the first control instruction input in a form of a second text in a non-fixed format,
transmitting the control information to the server;
wherein the server analyzes the control information to obtain the first control instruction and transmits the first control instruction to the second apparatus client directly or indirectly through the server; and
in response to receiving the control information associated with the first control instruction input in a form of voice data,
transmitting the control information to the server;
wherein the server analyzes the control information through voice recognition to obtain the first control instruction and transmits the first control instruction to the second apparatus client directly or indirectly through the server.

7. The method of claim 1, further comprising:
receiving apparatus information transmitted from the at least one first apparatus client directly or indirectly through a server, the apparatus information including attribute information or status information to be acquired by the at least one first apparatus client from the intelligent apparatus.

8. A user client comprising:
a computer-readable storage medium; and
one or more data processors coupled to the computer-readable storage medium and configured to:
establish a first association relationship with at least one first apparatus client for instant messaging through a predetermined network;
transmit a first control instruction to the at least one first apparatus client to trigger the apparatus client to control, according to the first control instruction, an intelligent apparatus connected to the apparatus client to execute one or more predetermined operations;
receive apparatus information of the intelligent apparatus;
display a list of associated intelligent apparatuses in a graphical user interface of the user client, the list including the intelligent apparatus having the first association relationship with the at least one first apparatus client; and
establish at least two apparatus groups based on a group-creation user selection on the graphical user interface designating multiple listed intelligent apparatus to be included in one of the at least two apparatus groups, the at least two apparatus groups including a monitoring apparatus group and a non-monitoring apparatus group, the monitoring apparatus group being associated with a first control mode, and the non-monitoring apparatus group being associated with a second control mode;
in response to a first user instruction directed to the monitoring apparatus group and received on the graphical user interface, respectively transmit, through the predetermined network, a first-type control instruction to each apparatus client corresponding to each intelligent apparatus in the monitoring apparatus group to trigger all intelligent apparatus in the monitoring apparatus group to perform a same first operation; and
in response to a second user instruction directed to the non-monitoring apparatus group and received on the graphical user interface, respectively transmit, through the predetermined network, a second-type control instruction to each apparatus client corresponding to each intelligent apparatus in the non-monitoring apparatus group to trigger all intelligent apparatus in the non-monitoring apparatus group to perform a same second operation,
wherein:
the intelligent apparatus is associated with either the monitoring apparatus group or the non-monitoring apparatus group based on the received apparatus information;
the first control mode of the monitoring apparatus group differs from the second control mode of the non-monitoring apparatus group;
the first-type control instruction is a switch-on instruction and the same first operation is switching on the corresponding intelligent apparatus in the monitoring apparatus group; or the first-type control instruction is a switch-off instruction and the same first operation is switching off the corresponding intelligent apparatus in the monitoring apparatus group; and
the one or more data processors are further configured to:
receive a control mode selection on the graphical user interface, the control mode selection comprising both the first user instruction and the second user instruction, wherein one of the first-type control instruction and the second-type control instruction is the switch-on instruction, and the other one of the first-type control instruction and the second-type control instruction is the switch-off instruction; and
transmit the first-type control instruction to each apparatus client corresponding to each intelligent apparatus in the monitoring apparatus group, at the same time as transmitting the second-type control instruction to each apparatus client corresponding to each intelligent apparatus in the non-monitoring apparatus group.

9. The user client of claim 8, wherein the one or more data processors are further configured to
acquire an ID of at least one first apparatus client through a predetermined mode, the predetermined mode including one selected from the group consisting of: scanning a two-dimensional code on the apparatus client, scanning a barcode on the apparatus client, receiving an input text, identifying a first text on the apparatus client, and communicating with the apparatus client through a near field communication (NFC) technology;
transmit a first addition request for adding the first association relationship to a server, the first addition request including the ID of the apparatus client; and
establish the first association relationship with the apparatus client in response to receiving a first successful-addition response from the server.

10. The user client of claim 9, wherein the one or more data processors are further configured to:
receive an authorization request transmitted by the server, wherein the authorization request is transmitted by the server to a first user client in a second association relationship with the at least one first apparatus client in response to the server receiving one or more second addition requests for adding one or more third association relationships from one or more second user clients, the second addition requests including the ID of the apparatus client;

receive an input signal indicating whether the authorization request is permitted; and in response to the input signal indicating the authorization request is permitted, transmit a permission feedback to the server so that the server transmits a second successful-addition response to the second user clients upon receiving the permission feedback.

11. The user client of claim 8, wherein the one or more data processors are further configured to, in response to the at least one first apparatus client including a single second apparatus client, transmit the first control instruction with the second apparatus client as a first object.

12. The user client of claim 11, wherein the one or more data processors are further configured to:

in response to receiving the first control instruction input in a form of a button, transmit the first control instruction to the second apparatus client directly or indirectly through the server;

in response to receiving the first control instruction input in a form of a first text in a fixed format, transmit the first control instruction to the second apparatus client directly or indirectly through the server;

in response to receiving control information associated with the first control instruction input in a form of a second text in a non-fixed format, analyze the control information to obtain the first control instruction and transmit the first control instruction to the second apparatus client directly or indirectly through the server;

in response to receiving control information associated with the first control instruction input in a form of a second text in a non-fixed format, transmit the control information to the server, wherein the server analyzes the control information to obtain the first control instruction and transmits the first control instruction to the second apparatus client directly or indirectly through the server;

in response to receiving the control information associated with the first control instruction input in a form of voice data, analyze the control information through voice recognition to obtain the first control instruction and transmit the first control instruction to the second apparatus client directly or indirectly through the server; or in response to receiving the control information associated with the first control instruction input in a form of voice data, transmit the control information to the server, wherein the server analyzes the control information through voice recognition to obtain the first control instruction and transmits the first control instruction to the second apparatus client directly or indirectly through the server.

13. The user client of claim 8, wherein the one or more data processors are further configured to:

set, in response to the at least one first apparatus client including a plurality of third apparatus clients, at least one control mode with the third apparatus clients as a second object, wherein the at least one control mode includes a plurality of second control instructions corresponding to the third apparatus clients;

receive a control signal which triggers or switches the at least one control mode; and transmit the second control instructions to the third apparatus clients directly or indirectly through a server based on at least information associated with the at least one control mode.

14. The user client of claim 8, wherein the one or more data processors are further configured to receive apparatus information transmitted from the at least one first apparatus client directly or indirectly through a server, the apparatus information including attribute information or status information to be acquired by the at least one first apparatus client from the intelligent apparatus.

* * * * *